(12) United States Patent
Rosen et al.

(10) Patent No.: US 12,355,085 B2
(45) Date of Patent: Jul. 8, 2025

(54) CATHODE COLLECTOR STRUCTURES FOR MOLTEN CARBONATE FUEL CELL

(71) Applicants: ExxonMobil Technology and Engineering Company, Annandale, NJ (US); FUELCELL ENERGY, INC., Danbury, CT (US)

(72) Inventors: Jonathan Rosen, Morristown, NJ (US); Timothy A. Barckholtz, Whitehouse Station, NJ (US); Heather A. Elsen, Bethlehem, PA (US); Gabor Kiss, Hampton, NJ (US); Lu Han, Beaumont, TX (US); Thomas M. Smith, Iselin, NJ (US); Sandipan K. Das, Spring, TX (US); Chao-Yi Yuh, New Milford, CT (US); Carl A. Willman, Newtown, CT (US); Timothy C. Geary, Stamford, CT (US); Keith E. Davis, Southbury, CT (US); Abdelkader Hilmi, Bethel, CT (US); Lawrence J. Novacco, Brookfield, CT (US)

(73) Assignees: ExxonMobil Technology and Engineering Company, Spring, TX (US); FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 16/695,276

(22) Filed: Nov. 26, 2019

(65) Prior Publication Data

US 2020/0176783 A1 Jun. 4, 2020

Related U.S. Application Data

(60) Provisional application No. 62/773,429, filed on Nov. 30, 2018.

(51) Int. Cl.
*H01M 4/86* (2006.01)
*H01M 8/0444* (2016.01)
(Continued)

(52) U.S. Cl.
CPC ......... *H01M 4/8626* (2013.01); *H01M 8/145* (2013.01); *H01M 2008/147* (2013.01)

(58) Field of Classification Search
CPC .............. H01M 4/8626; H01M 8/145; H01M 2008/147; H01M 8/04455; H01M 8/026; H01M 8/0254; H01M 8/0447; Y02E 60/50
(Continued)

(56) References Cited

U.S. PATENT DOCUMENTS 3,615,839 A 10/1971 Thompson et al.
3,970,474 A 7/1976 Anbar et al.
(Continued)

FOREIGN PATENT DOCUMENTS

AU 2014235193 B2 8/2017
CA 2120858 A1 10/1994
(Continued)

OTHER PUBLICATIONS

Campanari et al., Using MCFC for high efficiency CO2 capture from natural gas combined cycles: Comparison of internal and external reforming, Applied Energy, 112, 772-783, 2013, Elsevier (Year: 2013).*
(Continued)

*Primary Examiner* — Christian Roldan
(74) *Attorney, Agent, or Firm* — SHOOK, HARDY & BACON L.L.P.

(57) ABSTRACT

Cathode collector structures and/or corresponding cathode structures are provided that can allow for improved operation for a molten carbonate fuel cell when operated under
(Continued)

conditions for elevated $CO_2$ utilization. A cathode collector structure that provides an increased open area at the cathode surface can reduce or minimize the amount of alternative ion transport that occurs within the fuel cell. Additionally or alternately, grooves in the cathode surface can be used to increase the open area.

20 Claims, 15 Drawing Sheets

(51) Int. Cl.
H01M 8/04791 (2016.01)
H01M 8/14 (2006.01)
(58) Field of Classification Search
USPC .......................................................... 429/478
See application file for complete search history.

(56) References Cited

U.S. PATENT DOCUMENTS

| | | | |
|---|---|---|---|
| 4,041,210 A | 8/1977 | Van Dine |
| 4,160,663 A | 7/1979 | Hsieh |
| 4,389,467 A | 6/1983 | Singh et al. |
| 4,449,994 A | 5/1984 | Hegarty et al. |
| 4,476,633 A | 10/1984 | Brych |
| 4,476,683 A | 10/1984 | Shah et al. |
| 4,532,192 A | 7/1985 | Baker et al. |
| 4,567,117 A | 1/1986 | Patel et al. |
| 4,732,577 A | 3/1988 | Koizumi et al. |
| 4,772,634 A | 9/1988 | Farooque |
| 4,800,052 A | 1/1989 | Swarr et al. |
| 4,810,595 A | 3/1989 | Kahara et al. |
| 4,828,940 A | 5/1989 | Cohen et al. |
| 4,917,971 A | 4/1990 | Farooque |
| 4,921,765 A | 5/1990 | Gmeindl et al. |
| 4,925,745 A | 5/1990 | Remick et al. |
| 4,983,472 A | 1/1991 | Katz et al. |
| 4,995,807 A | 2/1991 | Rampley et al. |
| 5,039,579 A | 8/1991 | Kinoshita |
| 5,071,719 A | 12/1991 | Rostrup-Nielsen et al. |
| 5,079,103 A | 1/1992 | Schramm |
| 5,082,752 A | 1/1992 | Koga et al. |
| 5,084,362 A | 1/1992 | Farooque |
| 5,100,743 A | 3/1992 | Narita et al. |
| 5,134,043 A | 7/1992 | Nakazawa |
| 5,169,717 A | 12/1992 | Topsoe |
| 5,198,311 A | 3/1993 | Nakazawa et al. |
| 5,208,113 A | 5/1993 | Kinoshita |
| 5,232,793 A | 8/1993 | Miyauchi et al. |
| 5,376,472 A | 12/1994 | Hartvigsen et al. |
| 5,380,600 A | 1/1995 | Hansen et al. |
| 5,413,878 A | 5/1995 | Williams et al. |
| 5,417,051 A | 5/1995 | Ankersmit et al. |
| 5,422,195 A | 6/1995 | Bernard |
| 5,449,568 A | 9/1995 | Micheli et al. |
| 5,468,573 A | 11/1995 | Bregoli et al. |
| 5,470,670 A | 11/1995 | Yasumoto et al. |
| 5,518,827 A | 5/1996 | Matsumura et al. |
| 5,518,828 A | 5/1996 | Senetar |
| 5,541,014 A | 7/1996 | Micheli et al. |
| 5,554,453 A | 9/1996 | Steinfeld et al. |
| 5,616,430 A | 4/1997 | Aoyama |
| 5,660,941 A | 8/1997 | Farooque et al. |
| 5,688,292 A | 11/1997 | Antolini |
| 5,736,026 A | 4/1998 | Patel et al. |
| 5,833,734 A | 11/1998 | Cip et al. |
| 6,030,718 A | 2/2000 | Fuglevand et al. |
| 6,063,141 A | 5/2000 | Wendt et al. |
| 6,063,515 A | 5/2000 | Epp et al. |
| 6,083,636 A | 7/2000 | Hsu |
| 6,090,312 A | 7/2000 | Ziaka et al. |
| 6,126,718 A | 10/2000 | Sawa et al. |
| 6,162,556 A | 12/2000 | Vollmar et al. |
| 6,267,799 B1 | 7/2001 | Innes et al. |
| 6,280,865 B1 | 8/2001 | Eisman et al. |
| 6,322,916 B1 | 11/2001 | Hemmes et al. |
| 6,365,290 B1 | 4/2002 | Ghezel-Ayagh et al. |
| 6,383,251 B1 | 5/2002 | Sherwood |
| 6,383,677 B1 | 5/2002 | Allen |
| 6,420,062 B1 | 7/2002 | Prohaska et al. |
| 6,492,045 B1 | 12/2002 | Blanchet et al. |
| 6,509,113 B2 | 1/2003 | Keegan |
| 6,517,963 B2 | 2/2003 | Lakshmanan et al. |
| 6,524,356 B2 | 2/2003 | Fournier et al. |
| 6,648,942 B2 | 11/2003 | Hoffman et al. |
| 6,660,069 B2 | 12/2003 | Sato et al. |
| 6,821,664 B2 | 11/2004 | Parks et al. |
| 6,833,207 B2 | 12/2004 | Joos et al. |
| 6,866,950 B2 | 3/2005 | Connor et al. |
| 6,887,601 B2 | 5/2005 | Moulthrop, Jr. et al. |
| 6,896,988 B2 | 5/2005 | Wang et al. |
| 6,924,053 B2 | 8/2005 | McElroy |
| 6,994,929 B2 | 2/2006 | Barbir et al. |
| 7,011,903 B2 | 3/2006 | Benson et al. |
| 7,014,940 B2 | 3/2006 | Hase et al. |
| 7,041,272 B2 | 5/2006 | Keefer et al. |
| 7,045,233 B2 | 5/2006 | McElroy et al. |
| 7,097,925 B2 | 8/2006 | Keefer |
| 7,132,182 B2 | 11/2006 | McElroy et al. |
| 7,141,323 B2 | 11/2006 | Ballantine et al. |
| 7,255,949 B2 | 8/2007 | Coors et al. |
| 7,276,306 B2 | 10/2007 | Pham et al. |
| 7,285,350 B2 | 10/2007 | Keefer et al. |
| 7,311,986 B2 | 12/2007 | Hsu |
| 7,396,603 B2 | 7/2008 | Farooque et al. |
| 7,416,800 B2 | 8/2008 | Benson et al. |
| 7,482,078 B2 | 1/2009 | Sridhar et al. |
| 7,503,178 B2 | 3/2009 | Bucker et al. |
| 7,520,916 B2 | 4/2009 | McElroy et al. |
| 7,563,527 B2 | 7/2009 | Tanaka et al. |
| 7,591,880 B2 | 9/2009 | Levan et al. |
| 7,601,207 B2 | 10/2009 | Moulthrop et al. |
| 7,604,684 B2 | 10/2009 | Menzel |
| 7,674,539 B2 | 3/2010 | Keefer et al. |
| 7,691,507 B2 | 4/2010 | Ballantine et al. |
| 7,752,848 B2 | 7/2010 | Balan et al. |
| 7,833,668 B2 | 11/2010 | Ballantine et al. |
| 7,846,599 B2 | 12/2010 | Ballantine et al. |
| 7,855,028 B2 | 12/2010 | Ryu et al. |
| 7,862,938 B2 | 1/2011 | Ghezel-Ayagh |
| 7,883,803 B2 | 2/2011 | McElroy et al. |
| 7,914,765 B2 | 3/2011 | McLean et al. |
| 7,939,219 B2 | 5/2011 | Johnsen et al. |
| 7,968,237 B2 | 6/2011 | Grieve et al. |
| 8,047,007 B2 | 11/2011 | Zubrin et al. |
| 8,062,799 B2 | 11/2011 | Jahnke et al. |
| 8,071,241 B2 | 12/2011 | Sridhar et al. |
| 8,080,344 B2 | 12/2011 | Skok et al. |
| 8,101,307 B2 | 1/2012 | McElroy et al. |
| 8,142,943 B2 | 3/2012 | McElroy et al. |
| 8,158,290 B2 | 4/2012 | Penev et al. |
| 8,241,400 B2 | 8/2012 | Grover |
| 8,293,412 B2 | 10/2012 | McElroy |
| 8,343,671 B2 | 1/2013 | Qi |
| 8,349,504 B1 | 1/2013 | Radovich |
| 8,512,901 B2 | 8/2013 | Kusnezoff et al. |
| 8,530,101 B2 | 9/2013 | Qi |
| 8,557,468 B2 | 10/2013 | Hilmi et al. |
| 8,562,903 B2 | 10/2013 | Hayton et al. |
| 8,790,618 B2 | 7/2014 | Adams et al. |
| 8,802,332 B2 | 8/2014 | Correa et al. |
| 8,815,462 B2 | 8/2014 | Ghezel-Ayagh et al. |
| 8,822,090 B2 | 9/2014 | Ma et al. |
| 8,882,865 B2 | 11/2014 | Johnston |
| 9,077,006 B2 | 7/2015 | Berlowitz et al. |
| 9,077,007 B2 | 7/2015 | Berlowitz et al. |
| 9,315,397 B2 | 4/2016 | Sivret |
| 9,365,131 B2 | 6/2016 | Jamal et al. |
| 9,455,458 B2 | 9/2016 | Yu et al. |
| 9,455,463 B2 | 9/2016 | Berlowitz et al. |
| 9,499,403 B2 | 11/2016 | Al-Muhaish et al. |
| 9,502,728 B1 | 11/2016 | Farooque et al. |

(56) References Cited

U.S. PATENT DOCUMENTS

| | | |
|---|---|---|
| 9,520,607 B2 | 12/2016 | Berlowitz et al. |
| 9,531,024 B2 | 12/2016 | Pollica et al. |
| 9,586,171 B2 | 3/2017 | Vanzandt et al. |
| 9,861,931 B2 | 1/2018 | Kuopanportti et al. |
| 10,093,997 B2 | 10/2018 | Berlowitz et al. |
| 10,673,084 B2 | 6/2020 | Ghezel-Ayagh |
| 2002/0106549 A1 | 8/2002 | Cooper et al. |
| 2002/0114989 A1* | 8/2002 | Allen ............... H01M 8/0247 429/238 |
| 2002/0142198 A1 | 10/2002 | Towler et al. |
| 2002/0142208 A1 | 10/2002 | Keefer et al. |
| 2002/0164522 A1 | 11/2002 | Huang et al. |
| 2002/0197518 A1 | 12/2002 | Blanchet et al. |
| 2003/0008183 A1 | 1/2003 | Hsu |
| 2003/0013448 A1 | 1/2003 | Dillinger et al. |
| 2003/0096155 A1 | 5/2003 | Hong et al. |
| 2003/0143448 A1 | 7/2003 | Keefer |
| 2003/0157383 A1 | 8/2003 | Takahashi |
| 2003/0207161 A1 | 11/2003 | Rusta-Sallehy et al. |
| 2003/0219637 A1 | 11/2003 | Coors |
| 2004/0028979 A1 | 2/2004 | Ballantine et al. |
| 2004/0038089 A1 | 2/2004 | Hoffjann et al. |
| 2004/0038115 A1* | 2/2004 | Johnsen ............. H01M 4/8885 429/478 |
| 2004/0043274 A1 | 3/2004 | Scartozzi et al. |
| 2004/0146760 A1 | 7/2004 | Miwa |
| 2004/0166384 A1 | 8/2004 | Schafer |
| 2004/0197612 A1 | 10/2004 | Keefer et al. |
| 2004/0202914 A1 | 10/2004 | Sridhar et al. |
| 2004/0221578 A1 | 11/2004 | Tijima et al. |
| 2004/0229102 A1 | 11/2004 | Jahnke et al. |
| 2005/0003247 A1 | 1/2005 | Pham et al. |
| 2005/0074657 A1 | 4/2005 | Rusta-Sallehy et al. |
| 2005/0079395 A1 | 4/2005 | Varatharajan et al. |
| 2005/0098034 A1 | 5/2005 | Gittleman et al. |
| 2005/0103827 A1 | 5/2005 | Twigg |
| 2005/0106429 A1 | 5/2005 | Keefer |
| 2005/0112425 A1 | 5/2005 | Hsu |
| 2005/0123810 A1 | 6/2005 | Balan |
| 2005/0164051 A1 | 7/2005 | Venkataraman et al. |
| 2005/0181247 A1 | 8/2005 | Foger et al. |
| 2005/0227137 A1 | 10/2005 | Suga |
| 2005/0233188 A1 | 10/2005 | Kurashima et al. |
| 2006/0115691 A1 | 6/2006 | Hilmen et al. |
| 2006/0123705 A1 | 6/2006 | Ma et al. |
| 2006/0127718 A1 | 6/2006 | Kurashima et al. |
| 2006/0159967 A1 | 7/2006 | Huijsmans et al. |
| 2006/0188761 A1 | 8/2006 | O'Brien et al. |
| 2006/0204806 A1 | 9/2006 | Takada et al. |
| 2006/0251940 A1 | 11/2006 | Bandhauer et al. |
| 2006/0269830 A1* | 11/2006 | Johnsen ............... H01M 8/144 429/442 |
| 2007/0009774 A1 | 1/2007 | Clawson et al. |
| 2007/0017367 A1 | 1/2007 | McElroy et al. |
| 2007/0031718 A1 | 2/2007 | Fujimura et al. |
| 2007/0044657 A1 | 3/2007 | LaVen et al. |
| 2007/0065688 A1 | 3/2007 | Shimazu et al. |
| 2007/0072027 A1 | 3/2007 | Sridhar et al. |
| 2007/0099038 A1 | 5/2007 | Galloway |
| 2007/0111054 A1 | 5/2007 | Gottmann et al. |
| 2007/0141409 A1 | 6/2007 | Cho et al. |
| 2007/0178338 A1 | 8/2007 | McElroy et al. |
| 2007/0184310 A1 | 8/2007 | Kim et al. |
| 2007/0193885 A1 | 8/2007 | Benicewicz et al. |
| 2007/0224467 A1 | 9/2007 | Nervi et al. |
| 2007/0231659 A1 | 10/2007 | Ma et al. |
| 2007/0243475 A1 | 10/2007 | Funada et al. |
| 2007/0246363 A1 | 10/2007 | Eisman et al. |
| 2007/0246374 A1 | 10/2007 | Eisman et al. |
| 2007/0287046 A1 | 12/2007 | Koda et al. |
| 2008/0057361 A1 | 3/2008 | Moon et al. |
| 2008/0063910 A1 | 3/2008 | Okuyama et al. |
| 2008/0124255 A1 | 5/2008 | Johnston |
| 2008/0160358 A1 | 7/2008 | Parodi et al. |
| 2008/0171244 A1 | 7/2008 | Okuyama et al. |
| 2008/0178463 A1 | 7/2008 | Okubora |
| 2008/0241612 A1 | 10/2008 | Ballantine et al. |
| 2008/0241638 A1 | 10/2008 | McElroy et al. |
| 2008/0245101 A1 | 10/2008 | Dubettier-Grenier et al. |
| 2008/0280180 A1 | 11/2008 | Correa et al. |
| 2008/0292921 A1 | 11/2008 | Lakshmanan et al. |
| 2008/0299425 A1 | 12/2008 | Kivisaari et al. |
| 2008/0311445 A1 | 12/2008 | Venkataraman et al. |
| 2009/0029204 A1 | 1/2009 | Venkataraman |
| 2009/0029205 A1 | 1/2009 | Venkataraman et al. |
| 2009/0042070 A1 | 2/2009 | Brown, Jr. et al. |
| 2009/0068512 A1 | 3/2009 | Gofer et al. |
| 2009/0084085 A1 | 4/2009 | Kawai |
| 2009/0155637 A1 | 6/2009 | Cui et al. |
| 2009/0155644 A1 | 6/2009 | Cui et al. |
| 2009/0155645 A1 | 6/2009 | Cui et al. |
| 2009/0155650 A1 | 6/2009 | Cui et al. |
| 2009/0169452 A1 | 7/2009 | Constantz et al. |
| 2009/0186244 A1 | 7/2009 | Mayer |
| 2009/0208784 A1 | 8/2009 | Perry et al. |
| 2009/0317667 A2 | 12/2009 | Nervi et al. |
| 2009/0317669 A1 | 12/2009 | Hildebrandt et al. |
| 2010/0015486 A1 | 1/2010 | Yoshiba |
| 2010/0028730 A1 | 2/2010 | Ghezel-Ayagh et al. |
| 2010/0035109 A1 | 2/2010 | Weingaertner et al. |
| 2010/0047641 A1 | 2/2010 | Jahnke et al. |
| 2010/0104903 A1 | 4/2010 | Gummalla et al. |
| 2010/0126180 A1 | 5/2010 | Forsyth et al. |
| 2010/0148410 A1 | 6/2010 | Bleifuss et al. |
| 2010/0199559 A1 | 8/2010 | Hallett et al. |
| 2010/0221633 A1 | 9/2010 | Fujita et al. |
| 2010/0239924 A1 | 9/2010 | McElroy et al. |
| 2010/0243475 A1 | 9/2010 | Eisman et al. |
| 2010/0266923 A1 | 10/2010 | McElroy et al. |
| 2010/0279181 A1 | 11/2010 | Adams et al. |
| 2011/0033771 A1 | 2/2011 | Bednarz et al. |
| 2011/0104577 A1 | 5/2011 | Cui et al. |
| 2011/0111315 A1 | 5/2011 | Cui et al. |
| 2011/0117460 A1 | 5/2011 | Shin |
| 2011/0154951 A1 | 6/2011 | Hiraoka |
| 2011/0167821 A1 | 7/2011 | Baker et al. |
| 2011/0171544 A1 | 7/2011 | Burmeister et al. |
| 2011/0223500 A1 | 9/2011 | Uematsu et al. |
| 2011/0223501 A1 | 9/2011 | Uematsu et al. |
| 2012/0000243 A1 | 1/2012 | Bough et al. |
| 2012/0028145 A1 | 2/2012 | Boden et al. |
| 2012/0034538 A1 | 2/2012 | Jahnke et al. |
| 2012/0058042 A1 | 3/2012 | Zauderer |
| 2012/0167620 A1 | 7/2012 | Van Dorst et al. |
| 2012/0171588 A1 | 7/2012 | Fan et al. |
| 2012/0189922 A1 | 7/2012 | Schmidt et al. |
| 2012/0214076 A1 | 8/2012 | Hakala |
| 2012/0251898 A1 | 10/2012 | Lehar et al. |
| 2012/0291483 A1 | 11/2012 | Terrien et al. |
| 2012/0295180 A1 | 11/2012 | Homma |
| 2012/0325053 A1 | 12/2012 | Grossi |
| 2013/0014484 A1 | 1/2013 | Caprile et al. |
| 2013/0081516 A1 | 4/2013 | Simmons |
| 2013/0111948 A1 | 5/2013 | Higginbotham |
| 2013/0126038 A1 | 5/2013 | Jamal et al. |
| 2013/0177824 A1 | 7/2013 | Cui et al. |
| 2013/0209904 A1 | 8/2013 | Liu et al. |
| 2013/0259780 A1 | 10/2013 | Handagama et al. |
| 2013/0337360 A1 | 12/2013 | Mahoney et al. |
| 2014/0242482 A1 | 8/2014 | Cui et al. |
| 2014/0260310 A1* | 9/2014 | Berlowitz ............... C04B 7/367 60/780 |
| 2014/0272613 A1 | 9/2014 | Berlowitz et al. |
| 2014/0272616 A1 | 9/2014 | Berlowitz et al. |
| 2014/0272641 A1* | 9/2014 | Berlowitz ............ H01M 8/0618 429/420 |
| 2014/0302413 A1 | 10/2014 | Berlowitz et al. |
| 2014/0326300 A1 | 11/2014 | Fuhrmann |
| 2014/0329160 A1 | 11/2014 | Ramaswamy et al. |
| 2014/0352309 A1 | 12/2014 | Kim et al. |
| 2015/0089951 A1 | 4/2015 | Barckholtz et al. |
| 2015/0093665 A1 | 4/2015 | Barckholtz et al. |
| 2015/0111160 A1 | 4/2015 | Brunhuber et al. |
| 2015/0122122 A1 | 5/2015 | W Mustapa et al. |

(56) References Cited

U.S. PATENT DOCUMENTS

| | | | |
|---|---|---|---|
| 2015/0191351 A1 | 7/2015 | Darde et al. | |
| 2015/0266393 A1 | 9/2015 | Jamal et al. | |
| 2015/0280265 A1 | 10/2015 | McLarty | |
| 2015/0321914 A1 | 11/2015 | Darde et al. | |
| 2016/0190604 A1* | 6/2016 | Evans | H01M 4/8817 |
| | | | 429/535 |
| 2016/0190613 A1 | 6/2016 | Shiokawa et al. | |
| 2016/0248110 A1 | 8/2016 | Ghezel-Ayagh | |
| 2016/0265122 A1 | 9/2016 | Zhu et al. | |
| 2016/0351930 A1 | 12/2016 | Jahnke et al. | |
| 2016/0365590 A1 | 12/2016 | Zheng et al. | |
| 2016/0365594 A1 | 12/2016 | Zheng et al. | |
| 2017/0040620 A1 | 2/2017 | Uwani | |
| 2017/0130582 A1 | 5/2017 | Hsu | |
| 2017/0141421 A1 | 5/2017 | Sundaram et al. | |
| 2017/0191139 A1 | 7/2017 | Berlowitz et al. | |
| 2017/0250429 A1 | 8/2017 | Diethelm et al. | |
| 2017/0271701 A1 | 9/2017 | Berlowitz et al. | |
| 2017/0271707 A1 | 9/2017 | Sasakawa et al. | |
| 2018/0034089 A1 | 2/2018 | Berlowitz et al. | |
| 2019/0051919 A1 | 2/2019 | Yoshizaki et al. | |
| 2019/0115610 A1 | 4/2019 | Quatannens et al. | |
| 2019/0131636 A1 | 5/2019 | Horst et al. | |
| 2019/0198904 A1* | 6/2019 | Ichikawa | H01M 8/188 |
| 2019/0386317 A1* | 12/2019 | Poizeau | C25B 11/069 |
| 2020/0020965 A1 | 1/2020 | Wang et al. | |
| 2020/0099066 A1 | 3/2020 | Ghezel-Ayagh | |
| 2020/0176783 A1 | 6/2020 | Rosen et al. | |
| 2020/0176787 A1 | 6/2020 | Geary et al. | |
| 2020/0176795 A1 | 6/2020 | Johnson | |
| 2020/0307997 A1 | 10/2020 | Tranier | |

FOREIGN PATENT DOCUMENTS

| | | |
|---|---|---|
| CA | 2325072 A1 | 4/2002 |
| CA | 2471587 A1 | 7/2003 |
| CA | 2551219 A1 | 1/2007 |
| CA | 2694153 A1 | 9/2011 |
| CA | 2902861 A1 | 9/2014 |
| CA | 2956439 C | 4/2017 |
| CN | 1520624 A | 8/2004 |
| CN | 101098022 A | 1/2008 |
| CN | 101285004 A | 10/2008 |
| CN | 101808723 A | 8/2010 |
| CN | 101809396 A | 8/2010 |
| CN | 101821891 A | 9/2010 |
| CN | 201902241 U | 7/2011 |
| CN | 102422108 A | 4/2012 |
| CN | 101796680 B | 10/2013 |
| CN | 104847424 A | 8/2015 |
| CN | 105050945 A | 11/2015 |
| CN | 105594049 A | 5/2016 |
| CN | 107251297 A | 10/2017 |
| CN | 207542331 U | 6/2018 |
| CN | 108780906 A | 11/2018 |
| DE | 40 05 468 A1 | 8/1991 |
| DE | 19515669 A1 | 10/1996 |
| DE | 19545186 A1 | 6/1997 |
| DE | 196 09 313 C1 | 9/1997 |
| DE | 199 41 724 A1 | 8/2000 |
| DE | 100 16 847 A1 | 10/2001 |
| DE | 10 2006 047 823 A1 | 2/2008 |
| DE | 10 2008 019 981 A1 | 10/2009 |
| EP | 0 170 277 A2 | 2/1986 |
| EP | 0 180 941 A2 | 5/1986 |
| EP | 0 473 153 A2 | 3/1992 |
| EP | 0 502 125 A1 | 9/1992 |
| EP | 0 678 926 A1 | 10/1995 |
| EP | 0 685 897 A1 | 12/1995 |
| EP | 0 691 701 A1 | 1/1996 |
| EP | 1 306 916 A1 | 5/2003 |
| EP | 1 670 090 A1 | 6/2006 |
| EP | 1 790 027 A2 | 5/2007 |
| EP | 1 926 171 A1 | 5/2008 |
| EP | 2 182 572 A1 | 5/2010 |
| EP | 2 589 902 A2 | 5/2013 |
| EP | 2 589 908 A2 | 5/2013 |
| EP | 2 991 139 A1 | 3/2016 |
| EP | 1 841 515 B1 | 6/2016 |
| EP | 2 011 183 B1 | 6/2016 |
| EP | 1 996 533 B1 | 7/2016 |
| EP | 1 273 061 B1 | 8/2016 |
| EP | 1 344 270 B1 | 6/2017 |
| EP | 3 360 189 A1 | 8/2018 |
| IT | 102009901749803 A1 | 1/2011 |
| JP | S56-69775 A | 6/1981 |
| JP | 858-093170 A | 6/1983 |
| JP | S62-241524 A | 10/1987 |
| JP | H02-075164 A | 3/1990 |
| JP | H02-281569 A | 11/1990 |
| JP | H03-001447 A | 1/1991 |
| JP | H03-210774 A | 9/1991 |
| JP | H04-039868 A | 2/1992 |
| JP | H04-334870 A | 11/1992 |
| JP | H05-029009 A | 2/1993 |
| JP | H05-163180 A | 6/1993 |
| JP | H05-503606 A | 6/1993 |
| JP | H05-325996 A | 12/1993 |
| JP | H06-196184 A | 7/1994 |
| JP | 07-220749 | 8/1995 |
| JP | H07201349 | 8/1995 |
| JP | H07-302604 A | 11/1995 |
| JP | H08-96824 A | 4/1996 |
| JP | H08-138701 A | 5/1996 |
| JP | H10-172595 A | 6/1998 |
| JP | H11-91427 A | 4/1999 |
| JP | H11-312527 A | 11/1999 |
| JP | 2001023670 A | 1/2001 |
| JP | 2002-151111 A | 5/2002 |
| JP | 2002-319428 A | 10/2002 |
| JP | 2002334714 A | 11/2002 |
| JP | 2004-014124 A | 1/2004 |
| JP | 2004-079495 A | 3/2004 |
| JP | 2004171802 A | 6/2004 |
| JP | 2004-186074 A | 7/2004 |
| JP | 2004-523086 A | 7/2004 |
| JP | 2005-190981 A | 7/2005 |
| JP | 2005179083 A | 7/2005 |
| JP | 2006-073316 A | 3/2006 |
| JP | 2007018907 A | 1/2007 |
| JP | 2007-52937 A | 3/2007 |
| JP | 2007-179910 A | 7/2007 |
| JP | 2007-214134 A | 8/2007 |
| JP | 2007-287580 A | 11/2007 |
| JP | 2008507113 A | 3/2008 |
| JP | 2008-527617 A | 7/2008 |
| JP | 2008-192425 A | 8/2008 |
| JP | 2008-287940 A | 11/2008 |
| JP | 2009-503788 A | 1/2009 |
| JP | 2009503790 A | 1/2009 |
| JP | 2009-043487 A | 2/2009 |
| JP | 2009-108241 A | 5/2009 |
| JP | 2010-055927 A | 3/2010 |
| JP | 2010228963 A | 10/2010 |
| JP | 2010-534913 A | 11/2010 |
| JP | 2011141967 A | 7/2011 |
| JP | 2011181440 A | 9/2011 |
| JP | 2011-207741 A | 10/2011 |
| JP | 2012519649 A | 8/2012 |
| JP | 2012531719 A | 12/2012 |
| JP | 2013-045535 A1 | 3/2013 |
| JP | 2016-511525 A | 4/2016 |
| JP | 2016-115479 A | 6/2016 |
| JP | 2016-517616 A | 6/2016 |
| JP | 2016-532243 A | 10/2016 |
| JP | 2018-521464 A | 8/2018 |
| JP | 2019-508860 A | 3/2019 |
| KR | 2006-0057023 A | 5/2006 |
| KR | 10-0651270 B1 | 11/2006 |
| KR | 10-0827954 B1 | 5/2008 |
| KR | 2009-0067426 A | 6/2009 |
| KR | 2009-0124824 A | 12/2009 |
| KR | 2010-0032974 A | 3/2010 |

(56) References Cited

FOREIGN PATENT DOCUMENTS

| | | |
|---|---|---|
| KR | 2011-0029963 A | 3/2011 |
| KR | 2011-0032443 A | 3/2011 |
| KR | 2011-0077775 A | 7/2011 |
| KR | 2012-0050319 A | 5/2012 |
| KR | 20130075492 A | 7/2013 |
| KR | 10-2013-0128116 A | 11/2013 |
| KR | 2014-0085839 A | 7/2014 |
| KR | 2015-0066314 A | 6/2015 |
| KR | 2016-0041309 A | 4/2016 |
| NL | 1008883 C2 | 10/1999 |
| WO | 91/08595 A1 | 6/1991 |
| WO | 97/21257 A2 | 6/1997 |
| WO | 97/33828 A1 | 9/1997 |
| WO | 00/31815 A1 | 6/2000 |
| WO | 02/069430 A2 | 9/2002 |
| WO | 02/070402 A2 | 9/2002 |
| WO | 2002/103833 A1 | 12/2002 |
| WO | 2003/063276 A2 | 7/2003 |
| WO | 2004/013924 A2 | 2/2004 |
| WO | 2005/001977 A1 | 1/2005 |
| WO | 2006/072262 A1 | 7/2006 |
| WO | 2007/015689 A2 | 2/2007 |
| WO | 2008/036169 A2 | 3/2008 |
| WO | 2009/013455 A2 | 1/2009 |
| WO | 2009/059571 A1 | 5/2009 |
| WO | 2010/044113 A1 | 4/2010 |
| WO | 2010/067223 A1 | 6/2010 |
| WO | 2010/125443 A1 | 11/2010 |
| WO | 2010/147885 A1 | 12/2010 |
| WO | 2010/147886 A1 | 12/2010 |
| WO | 2011/077224 A1 | 6/2011 |
| WO | 2011/089382 A2 | 7/2011 |
| WO | 2011/111553 A1 | 9/2011 |
| WO | 2012/091096 A1 | 7/2012 |
| WO | 2012/128928 A1 | 9/2012 |
| WO | 2012/176176 A1 | 12/2012 |
| WO | 2012/176177 A1 | 12/2012 |
| WO | 2014/151207 A1 | 9/2014 |
| WO | 2015/059507 A1 | 4/2015 |
| WO | 2015/116964 A1 | 8/2015 |
| WO | 2015/124183 A1 | 8/2015 |
| WO | 2015/124700 A1 | 8/2015 |
| WO | 2015/133757 A1 | 9/2015 |
| WO | 2016/100849 A1 | 6/2016 |
| WO | 2016/196952 A1 | 12/2016 |
| WO | 2017/160511 A1 | 9/2017 |
| WO | 2017/223218 A1 | 12/2017 |
| WO | 2018/222265 A1 | 12/2018 |
| WO | 2019/175850 A1 | 9/2019 |

OTHER PUBLICATIONS

Appleby A. J., and Selman, J. R., "Current Technology of PAFC, MCFC and SOFC Systems: Status of Present Fuel Cell Power Plants", Electrochemical Hydrogen Technologies, pp. 425-495 (Jan. 1, 1990).

Appleby, A. J., "Fuel Cells and Hydrogen Fuel", International Journal of Hydrogen Energy, vol. 19, No. 2, pp. 175-180 (1994).

Amorelli, A., et al., "An experimental investigation into the use of molten carbonate fuel cells to capture CO2 from gas turbine exhaust gases", Second annual conference on Carbon Sequestration, pp. 1-9 (May 5-8, 2003).

Amorelli, A., et al., "An experimental investigation into the use of molten carbonate fuel cells to capture CO2 from gas turbine exhaust gases", Energy, vol. 29, pp. 1279-1284 (2004).

Abu-Zahra, M. R.M, et al.,"CO2 capture from power plants: Part I. A parametric study of the technical performance based on monoethanolamine", International Journal of Greenhouse Gas Control, vol. 1, pp. 37-46 (2007).

Appl, M., "Ammonia, 3. Production Plants", Ullmann's Encyclopedia of Industrial Chemistry, vol. 3, pp. 1-35 (2012).

Bianchi A., et al., "Bimodal Pore Size Distribution in MCFC Cathode Structure", Extended Abstracts, Electrochemical Society, vol. 95/01, pp. 858-859 (May 1995).

Cavallaro, S., et al., "Syngas and electricity production by an integrated autothermal reforming/molten carbonate fuel cell system", Journal of Power Sources, vol. 76, pp. 190-196 (1998).

Chiesa, P., et al., "A Comparative Analysis of IGCCs with CO2 Sequestration", Greenhouse Gas Control Technologies, pp. 107-112 (1999).

Campanari, S., "Carbon Dioxide separation from high temperature fuel cell power plants", Journal of Power Sources, vol. 112, pp. 273-289 (2002).

Campanari, S., et al., "CO2 capture from combined cycles integrated with Molten Carbonate Fuel Cells", International Journal of Greenhouse Gas Control, vol. 4, pp. 441-451 (2010).

Campanari, S., et al., "Application of MCFCs for active CO2 capture within natural gas combined cycles", Energy Procedia, vol. 4, pp. 1235-1242 (2011).

Caprile, L., et al., "Carbon capture: Energy wasting technologies or the MCFCs challenge?", International Journal of Hydrogen Energy, vol. 36, pp. 10269-10277 (2011).

Chiesa, P., et al., "CO2 cryogenic separation from combined cycles integrated with molten carbonate fuel cells", International Journal of Hydrogen Energy, vol. 36, pp. 10355-10365 (2011).

Desideri, U., et al., "MCFC-based CO2 capture system for small scale CHP plants", International Journal of Hydrogen Energy, vol. 37, pp. 19295-19303 (2012).

Ghezel-Ayagh, H., "High Efficiency Direct FuelCell/Turbine® Power Plant", Project Fact Sheet, Fuel Cell Energy, pp. 3 (2011).

Ghezel-Ayagh, H., "Electrochemical Membrane for CO2 Capture and Power Generation", Presentation at the 2012 NETL CO2 Capture Technology Meeting, Fuel Cell Energy, pp. 12 (Jul. 9, 2012).

Giddey, S., et al., "A comprehensive review of direct carbon fuel cell technology", Progress in Energy Combustion Science, vol. 38, pp. 360-399 (2012).

Keil, F. J., "Methanol-to-hydrocarbons: process technology", Microporous and Mesoporous Materials, vol. 29, pp. 49-66 (1999).

Kim, D. H., et al., "Numerical studies of a separator for stack temperature control in a molten carbonate fuel cell", International Journal of Hydrogen Energy, vol. 36, pp. 8499-8507 (2011).

Lowe, C., et al., "Technology Assessment of Hydrogen Firing of Process Heaters", Energy Procedia, ScienceDirect, vol. 4, pp. 1058-1065 (2011).

Morita, H., et al., "Degradation Mechanism of Molten Carbonate Fuel Cell Based on Long-Term Performance: Long-Term Operation by Using Bench-Scale Cell and Post-Test Analysis of the Cell", Journal of Power Sources, vol. 195, pp. 6988-6996 (2010).

Manzolini, G., et al., "CO2 Separation from Combined Cycles Using Molten Carbonate Fuel Cells", Journal of Fuel Cell Science and Technology, vol. 9, pp. 011018-1 to 011018-8 (2012).

Naqvi, S. N., "Dimethyl Ether As Fuel", SRI Consulting Report, Report No. 245A, pp. 188 (Sep. 2005).

Pilatowsky, I., et al., "Thermodynamics Of Fuel Cells", Cogeneration Fuel Cell-Sorption Air Conditioning Systems, pp. 25-36 (2011).

Sugiura, K., et al., "The carbon dioxide concentrator by using MCFC", Journal of Power Sources, vol. 118, pp. 218-227 (2003).

Steynberg, A., "Gas loop for POX reformers : Figure 8", Studies in Surface Science and Catalysis: Fischer Tropsch Technology, vol. 152, pp. 8 (2004).

Verda, V., and Nicolin, F., "Thermodynamic and economic optimization of a MCFC-based hybrid system for the combined production of electricity and hydrogen", International Journal of Hydrogen Energy, vol. 35, pp. 794-806 (2010).

Wesoff, E., "Will FuelCell Energy Be The First Profitable Company In The Industry?", Greentech Media, pp. 3 (Dec. 15, 2011).

Zhou, W., et al., "Decrease of energy demand for bioethanol-based polygeneration system through case study", Applied Energy, vol. 95, pp. 305-311 (2012).

International Search Report and Written Opinion received for PCT Patent Application No. PCT/US2019/063296, dated Feb. 18, 2020, 11 pages.

(56) References Cited

OTHER PUBLICATIONS

International Search Report and Written Opinion received for PCT Patent Application No. PCT/US2019/063255, dated Mar. 4, 2020, 11 pages.
International Search Report and Written opinion received for PCT Patent Application No. PCT/US2019/063293, dated Mar. 13, 2020, 10 pages.
International Search Report and Written Opinion received for PCT Patent Application No. PCT/US2019/063301, dated Mar. 13, 2020, 9 pages.
International Search Report and Written Opinion received for PCT Patent Application No. PCT/US2019/063248, dated Mar. 13, 2020, 10 pages.
International Search Report and Written Opinion received for PCT Patent Application No. PCT/US2019/063434, dated Mar. 24, 2020, 11 pages.
International Search Report and Written Opinion received for PCT Patent Application No. PCT/US2019/063337, dated Mar. 31, 2020, 9 pages.
International Search Report and Written Opinion received for PCT Patent Application No. PCT/US2019/063304, dated Apr. 1, 2020, 11 pages.
International Search Report and Written Opinion received for PCT Patent Application No. PCT/US2019/063291, dated Aug. 18, 2020, 13 pages.
International Search Report and Written Opinion received for PCT Patent Application No. PCT/US2019/063345, dated Aug. 20, 2020, 13 pages.
International Search Report and Written Opinion received for PCT Patent Application No. PCT/US2019/063333, dated Nov. 25, 2020, 20 pages.
"Heat of Combustion", Wikipedia, Retrieved from Internet URL : http://en.wikipediaorg/wiki/Lower_heating_value, accessed on Jun. 24, 2014, pp. 8.
"Lower and Higher Heating Values of Fuels", Hydrogen Data Resource Center: Hydrogen Calculator, p. 1 (2012).
"Molten Carbonate Fuel Cell Technology", Fossil Energy—U.S. Department of Energy, pp. 2 (Jan. 31, 2011).
"Test and Quality Assurance Plan : FuelCell Energy, Inc.—DFC 300A Molten Carbonate Fuel Cell Combined Heat and Power System", Greenhouse Gas Technology Center, pp. 1-42 (Mar. 2007).
Avidan, A. A., "Gasoline and Distillate Fuels from Methanol", Elsevier Science Publishers B.V, pp. 307-323 (1988).
Non-Final Office Action dated Jun. 16, 2021 in U.S. Appl. No. 16/695,356, 5 pages.
Non-Final Office Action dated Jul. 22, 2021 in U.S. Appl. No. 16/695,368, 8 pages.
Non-Final Office Action dated Aug. 10, 2021 in U.S. Appl. No. 16/695,281, 15 pages.
Notice of Allowance dated Aug. 17, 2021 in U.S. Appl. No. 16/695,335, 12 pages.
International Preliminary Report on Patentability received for PCT Application No. PCT/US2019/063304, dated Jun. 10, 2021, 8 pages.
International Preliminary Report on Patentability received for PCT Application No. PCT/US2019/063301, dated Jun. 10, 2021, 8 pages.
International Preliminary Report on Patentability received for PCT Application No. PCT/US2019/063296, dated Jun. 10, 2021, 9 pages.
International Preliminary Report on Patentability received for PCT Application No. PCT/US2019/063293, dated Jun. 10, 2021, 8 pages.
Final Office Action dated Nov. 15, 2021 in U.S. Appl. No. 16/695,368, 5 pages.
Notice of Allowance dated Nov. 23, 2021 in U.S. Appl. No. 16/695,356, 15 pages.
Final Office Action dated Dec. 21, 2021 in U.S. Appl. No. 16/695,281, 12 pages.
Non-Final Office Action dated Jan. 7, 2022 in U.S. Appl. No. 16/695,286, 6 pages.
Non-Final Office Action dated Jan. 20, 2022 in U.S. Appl. No. 16/695,280, 17 pages.
Non-Final Office Action dated Feb. 4, 2022 in U.S. Appl. No. 16/695,278, 18 pages.
Non-Final Office Action dated May 10, 2022 in U.S. Appl. No. 16/696,821, 8 pages.
Notice of Reasons for Refusal and Search Report received in JP Patent Application No. 2021-531318, dated May 31, 2022, 43 pages [Machine Translation Submitted].
Notice of Reasons for Refusal and Search Report received in JP Patent Application No. 2021-531317, dated May 31, 2022, 38 pages. [Machine Translation Submitted].
International Preliminary Report on Patentability received for PCT Application No. PCT/US2019/063291, dated Jun. 9, 2022, 8 pages.
International Preliminary Report on Patentability received for PCT Application No. PCT/US2019/063333, dated Jun. 9, 2022, 12 pages.
International Preliminary Report on Patentability received for PCT Application No. PCT/US2019/063345, dated Jun. 9, 2022, 7 pages.
Notice of Allowance dated Jun. 10, 2022 in U.S. Appl. No. 16/695,286, 11 pages.
Notice of Allowance dated Feb. 11, 2022 in U.S. Appl. No. 16/695,368, 7 pages.
Non-Final Office Action dated Mar. 16, 2022 in U.S. Appl. No. 16/695,362, 11 pages.
Notice of Allowance dated Apr. 19, 2022 in U.S. Appl. No. 16/695,349, 9 pages.
Canadian Office Action received for Canadian Patent Application No. 3,121,537, dated Mar. 21, 2022, 4 pages.
Canadian Office Action received for Canadian Patent Application No. 3,121,538, dated Mar. 21, 2022, 4 pages.
Notice of Reasons for Refusal received in JP Patent Application No. 2021-531318, mailed on Oct. 4, 2022, 8 bages. (English Translation Submitted).
Final Office Action dated Jul. 25, 2022 in U.S. Appl. No. 16/695,278, 19 pages.
Final Office Action dated Jul. 27, 2022 in U.S. Appl. No. 16/695,280, 17 pages.
Non-Final Office Action dated Jul. 29, 2022 in U.S. Appl. No. 16/695,281, 14 pages.
Final Office Action dated Sep. 21, 2022 in U.S. Appl. No. 16/695,362, 12 pages.
First Examination Report received for Australian Patent Application No. 2019476316, mailed on Jan. 25, 2023, 2 bages.
Office Action received for Canadian Patent Application No. 3159772, mailed on Feb. 23, 2023, 3 pages.
Notice of Allowance received for Canadian Patent Application No. 3121538, mailed on Mar. 7, 2023, 1 page.
Office Action received for Canadian Patent Application No. 31622231, mailed on Mar. 16, 2023, 3 pages.
First Examination Report received for Austrailian Patent Application No. 2019476660, mailed on Mar. 17, 2023, 3 pages.
First Examination Report received for Australian Patent Application No. 2019476337, mailed on Apr. 14, 2023, 4 pages.
Notice of Allowance dated Feb. 1, 2023 in U.S. Appl. No. 16,695,278, 8 pages.
Non-Final Office Action dated Apr. 14, 2023 in U.S. Appl. No. 16/695,281, 13 pages.
Non-Final Office Action dated Apr. 18, 2023 in U.S. Appl. No. 17/677,363, 8 pages.
Notice of Allowance dated Oct. 27, 2022 in U.S. Appl. No. 16/696,821, 12 pages.
Notice of Allowance dated Nov. 16, 2022 in U.S. Appl. No. 17/867,324, 8 pages.
Notice of Allowance dated Jan. 18, 2023 in U.S. Appl. No. 16/695,368, 7 pages.
Non-Final Office Action dated Jan. 17, 2023 in U.S. Appl. No. 17/941,291, 11 pages.
Decision to Grant received in JP Patent Application No. 2021-531317, mailed on Nov. 29, 2022, 5 pages. (English Translation Submitted).

(56) References Cited

OTHER PUBLICATIONS

Canadian Office Action received for Canadian Patent Application No. 3121537, mailed on Jan. 9, 2023, 3 pages.
Decision to Grant received in JP Patent Application No. 2021-531318, mailed on Apr. 25, 2023, 5 pages. (English Translation submitted).
Office Action and Search Report received for Japanese Patent Application No. 2022-530259, mailed on Jun. 20, 2023. 8 pages. (English translation submitted).
Office Action received for Korean Patent Application No. 10-2021-7020275, mailed on May 18, 2023, 18 pages. (English translation submitted).
Canadian Office Action received for Canadian Patent Application No. 3,162,614, mailed on May 23, 2023, 3 pages.
Office Action received for European Patent Application No. 19827916.8, mailed on May 25, 2023, 5 pages.
Notification of Allowance and Search received for Chinese Patent Application No. 201980087107.5, mailed on May 29, 2023, 7 pages. (English translation submitted).
Notification of Allowance and Search received for Chinese Patent Application No. 201980090518.X, mailed on May 29, 2023, 7 pages. (English translation submitted).
Office Action received in Japanese Patent Application No. 2022-530718 mailed on Jun. 13, 2023, 8 pages. [English Translation submitted].
Search Report received for Japanese Patent Application No. 2022-530259, mailed on May 15, 2023, 23 pages. (English translation submitted).
Office Action received in Korean Patent Application No. 2021-7020267 mailed on Jun. 15, 2023, 14 pages. [English Translation submitted].
Office Action received in Japanese Patent Application No. 2022-530808 mailed on Jun. 20, 2023, 10 pages. [English Translation submitted].
Non-Final Office Action dated May 12, 2023 in U.S. Appl. No. 16/695,280, 16 pages.
Notice of Allowance dated Sep. 20, 2023 in U.S. Appl. No. 17/677,363, 12 pages.
Notice of Allowance dated Aug. 2, 2023 in U.S. Appl. No. 17/941,291, 13 pages.
Non-Final Office Action dated Sep. 6, 2023 in U.S. Appl. No. 18/110,097, 16 pages.
Notice of Allowance dated Sep. 7, 2023 in U.S. Appl. No. 16/695,281, 11 pages.
Non-Final Office Action dated Aug. 16, 2023 in U.S. Appl. No. 16/695,362, 14 pages.
First Office Action and Search received for Chinese Patent Application No. 201980078699.4, mailed on Aug. 16, 2023, 23 pages. (English translation submitted).
First Office Action and Search received for Chinese Patent Application No. 201980102582.5, mailed on Aug. 4, 2023, 11 pages. (English translation submitted).
Office Action and Search received for Chinese Patent Application No. 201980102537.X, mailed on Jul. 29, 2023, 20 pages. (English translation submitted).
Notice of Acceptance received for Australian Patent Application No. 2019476660, mailed on Aug. 31, 2023, 3 pages.
First Office Action and Search received for Chinese Patent Application No. 201980102495.X, mailed on Aug. 30, 2023, 13 pages. (English translation submitted).
Notice of Acceptance received for Australian Patent Application No. 2019476316, mailed on Aug. 1, 2023, 3 pages.
Second Examination Report received for Australian Patent Application No. 2019476338, mailed on Sep. 13, 2023, 4 pages.
Canadian Office Action received for Canadian Patent Application No. 3162231, mailed on Oct. 17, 2023, 3 pages.
Non-Final Office Action dated Nov. 22, 2023 in U.S. Appl. No. 16/695,280, 17 pages.

Notice of Allowance received for Korean Patent Application No. 2021-7020267, mailed on Nov. 3, 2023, 4 pages. (English translation submitted).
First Office Action and Search received for Chinese Patent Application No. 201980078515.4, mailed on Oct. 21, 2023, 16 pages. (English translation submitted).
Office Action received in Japanese Patent Application No. 2022-530718 mailed on Dec. 5, 2023, 5 pages. [English Translation submitted].
Notice of Allowance received for Canadian Patent Application No. 3121537, mailed on Oct. 27, 2023, 1 page.
Office Action received in Japanese Patent Application No. 2023-085041 mailed on Dec. 5, 2023, 4 pages. [English Translation submitted].
Notice of Allowance received for Canadian Patent Application No. 3162614, mailed on Oct. 19, 2023, 1 page.
"PROX", Wikipedia, Retrieved from the Internet : URL : https://en.wikipedia.org/w/index.php? title=PROX&oldid=697317259, accessed on Dec. 20, 2023, p. 2 (Dec. 29, 2015).
Communication pursuant to Article 94(3) EPC in EP 17786599.5 dated Jan. 30, 2020 (6 pages).
Extended European Search Report and Opinion received for European Patent Application No. 17786599.5, mailed on May 20, 2019, 7 pages.
Extended European Search Report and Opinion received for European Patent Application No. 17786629.0, mailed on Mar. 26, 2019, 9 pages.
Extended European Search Report and Opinion received for European Patent Application No. 17790107.1, mailed on Nov. 29, 2019, 10 pages.
Extended European Search Report and Opinion received for European Patent Application No. 21154960.5, mailed on May 17, 2021, 9 pages.
Final Office Action dated Aug. 18, 2020 in U.S. Appl. No. 16/094,792, 26 pages.
First Office Action and Search received for Japanese Patent Application No. 2018-554735, mailed on Nov. 11, 2019, 8 pages. (English Translation Submitted).
First Office Action and Search received for Japanese Patent Application No. 2018-555215, mailed on Dec. 20, 2019, 9 pages. (English Translation Submitted).
First Office Action and Search received for Japanese Patent Application No. 2018-556825, mailed on Feb. 25, 2020, 14 pages. (English Translation Submitted).
International Preliminary Report on Patentability received for PCT Application No. PCT/US2016/035745, mailed on Dec. 14, 2017, 7 pages.
International Preliminary Report on Patentability received for PCT Application No. PCT/US2017/027261, mailed on Nov. 8, 2018, 9 pages.
International Preliminary Report on Patentability received for PCT Application No. PCT/US2017/028487, mailed on Oct. 23, 2018, 8 pages.
International Preliminary Report on Patentability received for PCT Application No. PCT/US2017/029667, mailed on Nov. 8, 2018, 6 pages.
International Search Report and Written Opinion received for PCT Patent Application No. PCT/US2017/028594, mailed on Aug. 24, 2017, 13 pages.
International Search Report and Written Opinion received for PCT Patent Application No. PCT/US2017/029667, mailed on Jul. 14, 2017, 6 pages.
International Search Report and Written Opinion received for PCT Patent Application No. PCT/US2016/035745, mailed on Sep. 30, 2016, 8 pages.
International Search Report and Written Opinion received for PCT Patent Application No. PCT/US2017/027261, mailed on Jul. 3, 2017, 10 pages.
International Search Report and Written Opinion received for PCT Patent Application No. PCT/US2017/028487, mailed on Jul. 10, 2017, 8 pages.

(56) References Cited

OTHER PUBLICATIONS

International Search Report and Written Opinion received for PCT Patent Application No. PCT/US2017/028526, mailed on Jul. 17, 2017, 8 pages.
Non-Final Office Action dated May 13, 2019 in U.S. Appl. No. 16/096,596, 7 pages.
Preinterview First Office Action dated Jun. 22, 2018 in U.S. Appl. No. 15/298,316, 5 pages.
Non-Final Office Action dated Jan. 4, 2021 in U.S. Appl. No. 16/095,261, 14 pages.
Notice of Allowance dated Jul. 17, 2020 in U.S. Appl. No. 16/095,281, 9 pages.
Canadian Office Action received for Canadian Patent Application No. 2988295, mailed on Feb. 5, 2018, 4 pages.
Canadian Office Action received for Canadian Patent Application No. 3021632, mailed on Oct. 3, 2019, 3 pages.
Non-Final Office Action dated Dec. 16, 2015 in U.S. Appl. No. 14/732,032, 11 pages.
Final Office Action dated May 13, 2016 in U.S. Appl. No. 14/732,032, 14 pages.
International Search Report and Written Opinion received for PCT Patent Application No. PCT/IB2021/051922, mailed on Jun. 16, 2021, 9 pages.
Non-Final Office Action dated Sep. 8, 2023 in U.S. Appl. No. 17/194,597, 7 pages.
Office action received for Chinese Patent Application No. 201980078515.4, mailed on Mar. 28, 2024, 13 pages (9 pages of Original OA and 4 pages of English Translation).
Office action received for Chinese Patent Application No. 201980102582.5, mailed on Mar. 27, 2024, 9 pages (5 pages of Original OA and 4 pages of English Translation).
Notice of Allowance received for Chinese Patent Application No. 201980078515.4, mailed on Jun. 20, 2024, 4 pages (2 pages of English Translation and 2 page of Original Document).
Non-Final Office Action received for U.S. Appl. No. 18/136,699, mailed on Jul. 5, 2024, 14 pages.
Decision to Grant received for Japanese Patent Application No. 2022-530718, mailed on Jun. 4, 2024, 5 pages (3 pages of Original OA and 2 pages of English Translation).
Notice of Allowance received for Chinese Patent Application No. 201980102582.5, mailed on Jun. 3, 2024, 4 pages (2 pages of Original OA and 2 pages of English Translation).
Office Action received for Chinese Patent Application No. 201980078699.4, mailed on May 1, 2024, 21 pages (8 pages of Original OA and 13 pages of English Translation).
Office Action received for Chinese Patent Application No. 201980102495.X, mailed on May 9, 2024, 14 pages (7 pages of Original OA and 7 pages of English Translation).
Office Action received for Chinese Patent Application No. 201980102537.X, mailed on May 1, 2024, 18 pages (7 pages of Original OA and 11 pages of English Translation).
Notice of Allowance received for U.S. Appl. No. 18/110,097, mailed on May 13, 2024, 9 pages.
Notice of Allowance received for U.S. Appl. No. 16/695,280, mailed on Apr. 1, 2025, 9 pages.
Notice of Allowance received for U.S. Appl. No. 16/695,362, mailed on Feb. 27, 2025, 9 pages.
Notice of Allowance received for U.S. Appl. No. 18/136,699, mailed on Feb. 27, 2025, 8 pages.

* cited by examiner

CATHODE COLLECTOR STRUCTURES FOR MOLTEN CARBONATE FUEL CELL

CROSS-REFERENCE TO RELATED APPLICATIONS

This application claims priority to U.S. Patent Application No. 62/773,429, filed Nov. 30, 2018 and entitled "Cathode Collector Structures for Molten Carbonate Fuel Cell." The entirety of the aforementioned application is incorporated by reference herein.

FIELD

Structures for improving the interface between the cathode and the cathode collector in a molten carbonate fuel cell are provided, along with methods of operating such a fuel cell.

BACKGROUND

This application discloses and claims subject matter made as a result of activities within the scope of a joint research agreement between ExxonMobil Research and Engineering Company and FuelCell Energy, Inc. that was in effect on or before the effective filing date of the present application.

Molten carbonate fuel cells utilize hydrogen and/or other fuels to generate electricity. The hydrogen may be provided by reforming methane or other reformable fuels in a steam reformer, such as a steam reformer located upstream of the fuel cell or integrated within the fuel cell. Fuel can also be reformed in the anode cell in a molten carbonate fuel cell, which can be operated to create conditions that are suitable for reforming fuels in the anode. Still another option can be to perform some reforming both externally and internally to the fuel cell. Reformable fuels can encompass hydrocarbonaceous materials that can be reacted with steam and/or oxygen at elevated temperature and/or pressure to produce a gaseous product that comprises hydrogen.

The basic structure of a molten carbonate fuel cell includes a cathode, an anode, and a matrix between the cathode and anode that includes one or more molten carbonate salts that serve as the electrolyte. During conventional operation of a molten carbonate fuel cell, the molten carbonate salts partially diffuse into the pores of the cathode. This diffusion of the molten carbonate salts into the pores of the cathode provides an interface region where $CO_2$ can be converted into $CO_3^{2-}$ for transport across the electrolyte to the anode.

In addition to these basic structures, volumes adjacent to the anode and cathode are typically included in the fuel cell. This allows an anode gas flow and a cathode gas flow to be delivered to the anode and cathode, respectively. In order to provide the volume for the cathode gas flow while still providing electrical contact between the cathode and the separator plate defining the outer boundary of the fuel cell, a cathode collector structure can be used. An anode collector can be used to similarly provide the volume for the anode gas flow.

U.S. Pat. Nos. 6,492,045 and 8,802,332 describe examples of current collectors for molten carbonate fuel cells. The current collectors correspond to corrugated structures.

SUMMARY

In an aspect, a method for producing electricity in a molten carbonate fuel cell is provided. The method can include introducing an anode input stream comprising $H_2$, a reformable fuel, or a combination thereof into an anode gas collection zone. The anode gas collection zone can be defined by an anode surface, a first separator plate, and an anode collector providing support between the anode surface and the separator plate. The method can further include introducing a cathode input stream comprising $O_2$, $H_2O$, and $CO_2$ into a cathode gas collection zone. The cathode gas collection zone can be defined by a cathode surface, a second separator plate, and a cathode collector providing support between the cathode surface and the second separator plate. The molten carbonate fuel cell can be operated at a transference of 0.97 or less and an average current density of 60 $mA/cm^2$ or more to generate electricity, an anode exhaust comprising $H_2$, CO, and $CO_2$, and a cathode exhaust comprising 2.0 vol % or less $CO_2$, 1.0 vol % or more $O_2$, and 1.0 vol % or more $H_2O$. Additionally or alternately, an average cathode gas lateral diffusion length can be 0.40 mm or less. Additionally or alternately, an open area of the cathode surface can correspond to 45% or more of a total surface area of the cathode surface.

In another aspect, a molten carbonate fuel cell is provided. The molten carbonate fuel cell can include an anode, a first separator plate, and an anode collector in contact with the anode and the first separator plate to define an anode gas collection zone between the anode and the first separator plate. The molten carbonate fuel cell can further include a cathode, a second separator plate, and a cathode collector in contact with the cathode and the second separator plate to define a cathode gas collection zone between the cathode and the second separator plate. The molten carbonate fuel cell can further include an electrolyte matrix comprising an electrolyte between the anode and the cathode. The molten carbonate fuel cell can further include an average cathode gas lateral diffusion length of 0.40 mm or less and/or an open area of the cathode surface that is greater than 45% of a total surface area of the cathode surface.

DETAILED DESCRIPTION OF THE EMBODIMENTS

Overview

In various aspects, cathode collector structures and/or corresponding cathode structures are provided that can allow for improved operation for a molten carbonate fuel cell when operated under conditions for elevated $CO_2$ utilization. When operating a molten carbonate fuel cell at conditions that result in substantial transference (such as a transference of 0.97 or less, or 0.95 or less), the cathode collector structure can increase the transference so that the amount of alternative ion transport that occurs within the fuel cell is reduced or minimized. This can allow elevated transfer of $CO_2$ to occur from cathode to anode while reducing or minimizing the amount of fuel cell degradation due to the transport of alternative ions.

The cathode collector structures and/or cathode structures can provide this benefit based on one or more characteristics of the structures. In some aspects, the cathode collector can be characterized based on the percentage of the cathode surface that $CO_2$ can effectively reach without requiring substantial diffusion through the cathode. One type of characterization can be based on the open area of the cathode. This corresponds to the portion of the cathode surface that is not in contact with the cathode collector. For example, as defined herein, the open area of the cathode surface can be 45% or more, or 50% or more, or 55% or more, or 60% or more, such as up to substantially all of the cathode surface corresponding to open area (i.e., up to roughly 99%). This is in contrast to conventional cathode collector structures, which can have open areas of the cathode surface of 40% or less, or 35% or less. Additionally or alternately, the characterization can be based on an average cathode gas lateral diffusion length to reach the cathode surface. For example, as defined herein, the average cathode gas lateral diffusion length can be 0.4 mm or less, or 0.3 mm or less, or 0.2 mm or less. Additionally or alternately, one option for increasing the open area can be to reduce or minimize the amount of contiguous closed or blocked area at the cathode surface. This can be achieved, for example, by using a cathode collector structure where the distance from any point on the cathode surface to an open area location is less than 1 mm in any direction.

It has been unexpectedly discovered that cathode collector structures that provide at least one of an open area of 45% or more or an average cathode gas lateral diffusion length of 0.4 mm can result in improved fuel cell performance when operating a fuel cell at elevated $CO_2$ utilization conditions. In various aspects, the improved fuel cell performance can correspond to an unexpected increase in fuel cell voltage and/or an unexpected decrease in transference (a decrease in the difference between measured $CO_2$ utilization and the amount of $CO_2$ utilization calculated based on the average current density).

Figure 1:
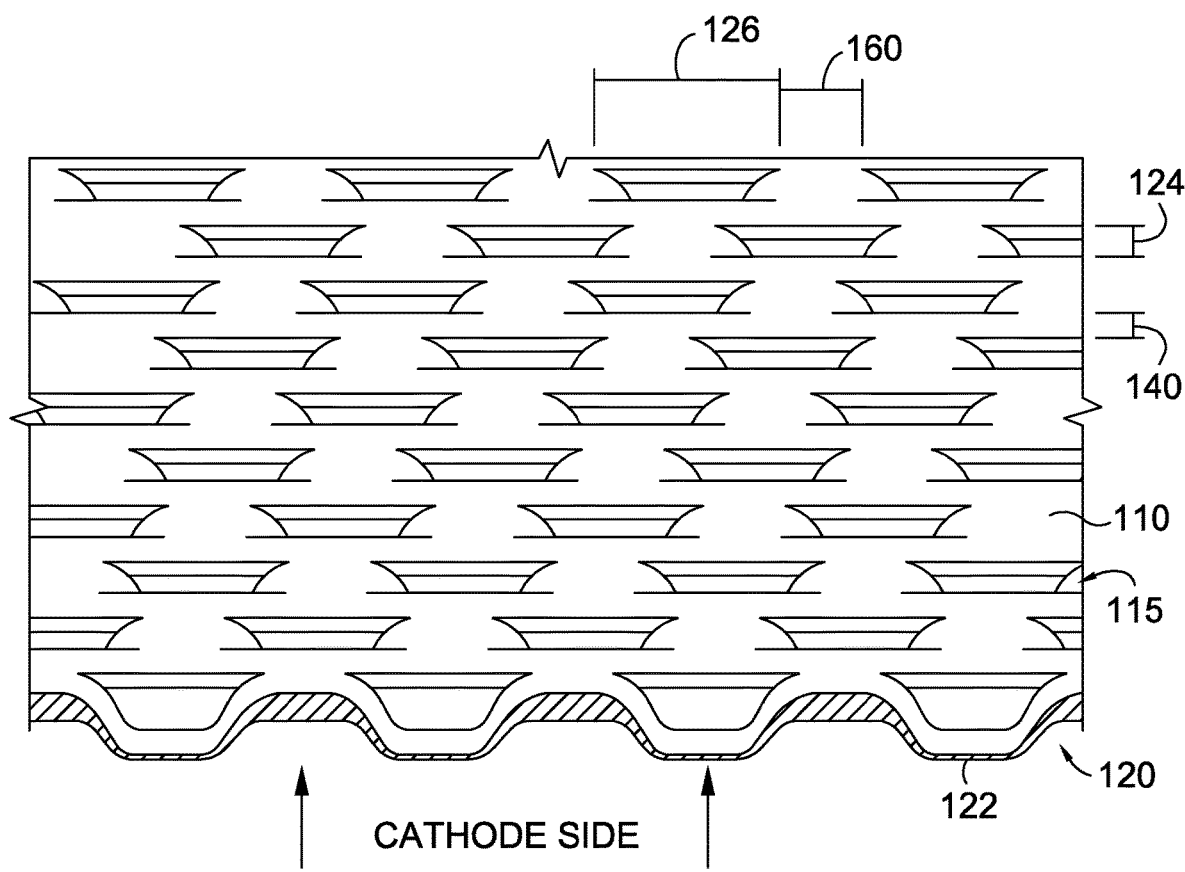
FIG. 1 shows an example of a cathode collector structure.

A typical value for the open area on the cathode surface in a conventional molten carbonate fuel is roughly 33%. FIG. 1 shows an example of a cathode collector configuration that would result in an open area of 33% if used in a conventional configuration. In FIG. 1, surface 110 of the collector corresponds to a plate-like surface that includes a regular pattern of openings 115. The openings 115 in surface 110 were formed by punching the surface to form loop structures 120 that extend below the plane of surface 110. In a conventional configuration, surface 110 would be placed in contact with a cathode surface, while loop structures 120 would extend upward to support a bipolar plate, separator plate, or other plate structure that is used to define the volume for receiving a cathode input gas. The plate structure would contact loop structures 120 at the bottom edge 122 of the loop structures. In FIG. 1, the spacing 140 between openings 120 is roughly the same distance as the length 124 of the openings 120. In FIG. 1, the spacing 160 between the openings is roughly half of the width 126 of the openings 120. Based on these relative distance relationships, this type of repeating pattern results in an open area of roughly 33%. It is noted that a typical value for length 124 can be roughly 2.0 mm, while a typical value for width 126 can be roughly 6.0 mm.

Figure 4:
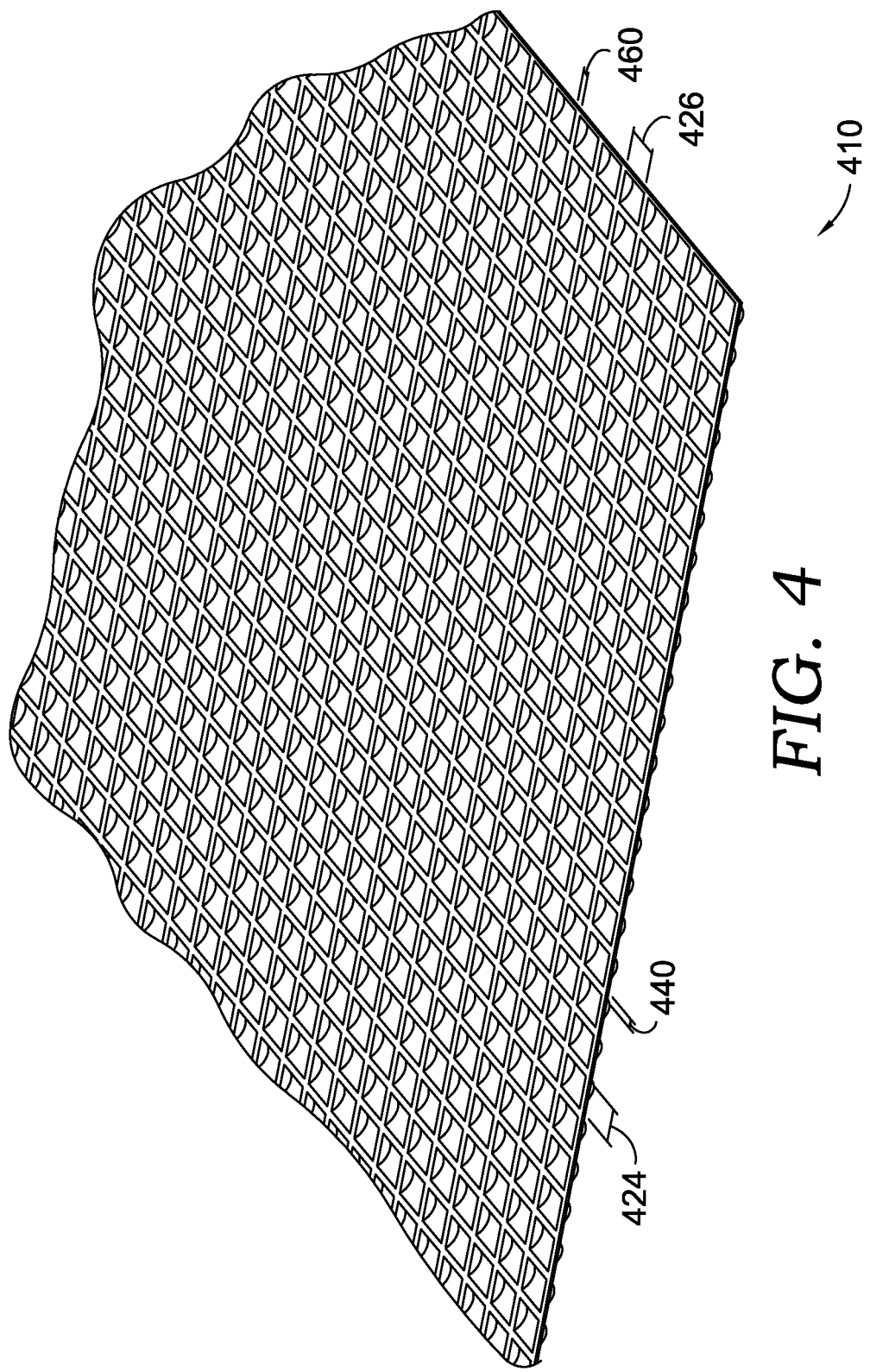
FIG. 4 shows an example of a cathode collector structure.

FIG. 4 shows an example of a different type of cathode collector configuration. In FIG. 4, the distance relationships between the openings and the spacing between the openings is changed. If the configuration in FIG. 4 is deployed with surface 410 in contact with a cathode surface, the resulting open area would be roughly 64%. This is based on the relationships of having length 424 and width 426 being roughly the same (i.e., roughly square openings), with spacing 440 and spacing 460 being roughly 0.125 times (i.e., roughly one-eighth) the length and width, respectively. An example of a suitable value for length 424 and width 426 is roughly 5.1 mm, while a suitable value for spacing 440 and 460 is roughly 0.635 mm. It is noted that the rectangular pattern in FIG. 1 and the square pattern in FIG. 4 represent convenient patterns for illustration, and that any other convenient type of pattern and/or irregular arrangement of openings could also be used.

In some aspects, increased open area and/or reduced cathode gas diffusion length can be provided by using a cathode collector similar to FIG. 4, where a configuration with surface 410 in contact with the cathode surface results in an open area of 45% or more. In other aspects, increased open area and/or reduced cathode gas diffusion length can be provided by using a cathode configuration where the loop structures of the collector are in proximity to the cathode surface and the plate-like structure (if any) is in contact with the separator plate. In such a configuration, the open area of the cathode surface can be substantially increased and can typically be greater than 50%.

Additionally or alternately, in some aspects, the cathode collector can be characterized based on the contact area between the cathode and the cathode collector. Conventionally, typical cathode collector structures can interact with the cathode surface based on having a plate-like structure that has openings to allow the cathode input gas to have access to the cathode surface. In a conventional configuration, the plate-like structure is in contact with the cathode surface. Optionally, the openings in the plate-like structure can be formed by forming loop structures in the plate so that the loops protrude upward from the plate-like surface. The loop structures can then provide both support and electrical contact with the separator plate that defines the boundary of the fuel cell. For such a conventional configuration, providing sufficient electrical contact is of low concern. However, for cathode collector structures without a plate-like structure in contact with the cathode surface, the formation of carbonate ions may be limited due to lack of proximity to a conductive surface that can provide the needed electrons. One type of characterization can be based on the percentage of contact area between the cathode and the cathode collector. As defined herein, the percentage of contact area between the cathode surface and the cathode collector can be determined based on the open area, with the contact area being calculated by subtracting the open area from 100%. In some aspects, the contact area can be 10% or more, or 15% or more, or 18% or more, such as up to 65% or possibly still higher. Additionally or alternately, the characterization can be based on an average lateral contact length, corresponding to an average distance between a point on the cathode surface and a point of contact between the cathode collector and the cathode surface. For example, as defined herein, the average contact area diffusion length can be 1.0 mm or less, or 0.9 mm or less, or 0.7 mm or less.

Figure 14:
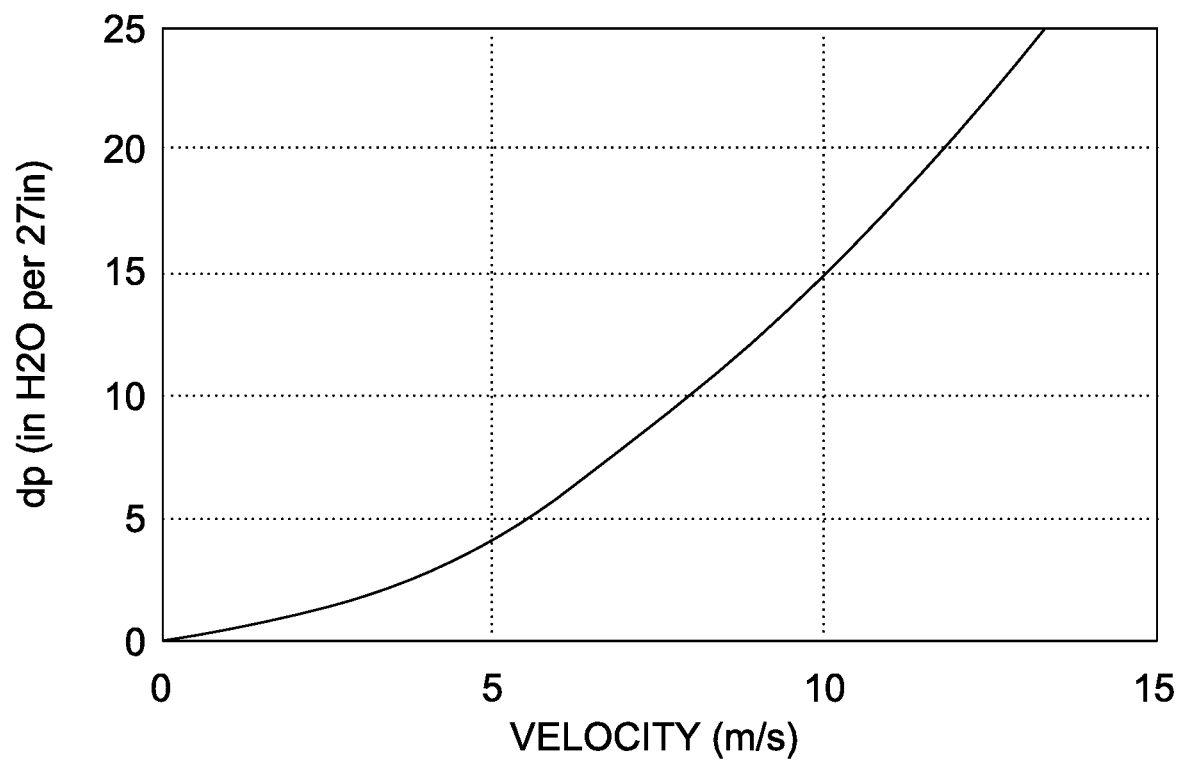
FIG. 14 shows an example of the relationship between pressure drop and inlet cathode gas velocity.

Still another type of characterization can be based on the pressure drop caused by the cathode collector. Generally, reducing the unblocked flow cross-section for the cathode gas collection volume can result in an increased pressure drop across the cathode. Because molten carbonate fuel cells are often operated at close to ambient pressure, a pressure drop of only a few kPa across the cathode gas collection volume can potentially be significant relative to proper operation of the fuel cell. Thus, when selecting a cathode collector structure to increase the open area at the cathode surface, it can also be beneficial to select a cathode collector structure that reduces or minimizes the amount of blocked flow cross-section of the cathode gas collector volume. For example, FIG. 14 shows an example of the pressure drop across a cathode gas collection volume relative to the velocity of the cathode input gas. In the example shown in FIG. 14, the height of the cathode gas collection volume is 0.58 inches (~1.5 cm). The length of the cathode gas collection volume is 27 inches (68.5 cm). Thus, the pressure drop shown corresponds to a pressure drop for gas after traversing the 68.5 cm of length of the cathode (i.e., the length of the cathode gas collection volume). As shown in FIG. 14, the pressure drop is less than 1 kPa at low velocities but has a parabolic increase with increasing velocity for the cathode input gas. It is noted that for conventional molten carbonate fuel cell operation for power generation, typical values of the cathode input gas flow velocity are roughly 5 m/s or less. By contrast, when operating a fuel cell for carbon capture, the cathode input gas flow velocity can be 5 m/s to 15 m/s, or possibly higher. At such higher values for the cathode input gas flow velocity, the pressure drop in FIG. 14 can be on the order of 2 kPa-5 kPa with only 10% of the flow channel blocked.

Conventional operating conditions for molten carbonate fuel cells typically correspond to conditions where the amount of alternative ion transport is reduced, minimized, or non-existent. The amount of alternative ion transport can be quantified based on the transference for a fuel cell. The transference is defined as the fraction of ions transported across the molten carbonate electrolyte that correspond to carbonate ions, as opposed to hydroxide ions and/or other ions. A convenient way to determine the transference can be based on comparing a) the measured change in $CO_2$ concentration at the cathode inlet versus the cathode outlet with b) the amount of carbonate ion transport required to achieve the current density being produced by the fuel cell. It is noted that this definition for the transference assumes that back-transport of $CO_2$ from the anode to the cathode is minimal. It is believed that such back-transport is minimal for the operating conditions described herein. For the $CO_2$ concentrations, the cathode input stream and/or cathode output stream can be sampled, with the sample diverted to a gas chromatograph for determination of the $CO_2$ content. The average current density for the fuel cell can be measured in any convenient manner.

Under conventional operating conditions, the transference can be relatively close to 1.0, such as 0.98 or more and/or such as having substantially no alternative ion transport. A transference of 0.98 or more means that 98% or more of the ionic charge transported across the electrolyte corresponds to carbonate ions. It is noted that hydroxide ions have a charge of −1 while carbonate ions have a charge of −2, so two hydroxide ions need to be transported across the electrolyte to result in the same charge transfer as transport of one carbonate ion.

In contrast to conventional operating conditions, operating a molten carbonate fuel cell with transference of 0.95 or less (or 0.97 or less when operating with a cathode collector that provides an increased open area) can increase the effective amount of carbonate ion transport that is achieved, even though a portion of the current density generated by the fuel cell is due to transport of ions other than carbonate ions. In order to operate a fuel cell with a transference of 0.97 or less, depletion of $CO_2$ has to occur within the fuel cell cathode. It has been discovered that such depletion of $CO_2$ within the cathode tends to be localized. As a result, many regions within a fuel cell cathode can still have sufficient $CO_2$ for normal operation. These regions contain additional $CO_2$ that would be desirable to transport across an electrolyte, such as for carbon capture. However, the $CO_2$ in such regions is typically not transported across the electrolyte when operating under conventional conditions. By selecting operating conditions with a transference of 0.97 or less, or 0.95 or less, the regions with sufficient $CO_2$ can be used to transport additional $CO_2$ while the depleted regions can operate based on alternative ion transport. This can increase the practical limit for the amount of $CO_2$ captured from a cathode input stream.

The structures described here can provide additional benefits when operating an MCFC to have enhanced $CO_2$ utilization. One difficulty in using MCFCs for elevated $CO_2$ capture is that the operation of the fuel cell can potentially be kinetically limited if one or more of the reactants required for fuel cell operation is present in low quantities. For example, when using a cathode input stream with a $CO_2$ content of 4.0 vol % or less, achieving a $CO_2$ utilization of 75% or more corresponds to a cathode outlet concentration of 1.0 vol % or less. However, a cathode outlet concentration of 1.0 vol % or less does not necessarily mean that the $CO_2$ is evenly distributed throughout the cathode. Instead, the concentration will typically vary within the cathode due to a variety of factors, such as the flow patterns in the anode and the cathode. The variations in $CO_2$ concentration can result in portions of the cathode where $CO_2$ concentrations substantially below 1.0 vol % are present.

Conventionally, it would be expected that depletion of $CO_2$ within the cathode would lead to reduced voltage and reduced current density. However, it has been discovered that current density can be maintained as $CO_2$ is depleted due to ions other than $CO_3^{2-}$ being transported across the electrolyte. For example, a portion of the ions transported across the electrolyte can correspond to hydroxide ions ($OH^-$). The transport of alternative ions across the electrolyte can allow a fuel cell to maintain a target current density even though the amount of $CO_2$ transported across the electrolyte is insufficient.

In contrast to conventional operating conditions, operating a molten carbonate fuel cell with transference of 0.95 or less (or 0.97 or less when operating with elevated pressure) can increase the effective amount of carbonate ion transport that is achieved, even though a portion of the current density generated by the fuel cell is due to transport of ions other than carbonate ions. In order to operate a fuel cell with a transference of 0.97 or less, or 0.95 or less, depletion of $CO_2$ has to occur within the fuel cell cathode. It has been discovered that such depletion of $CO_2$ within the cathode tends to be localized. As a result, many regions within a fuel cell cathode can still have sufficient $CO_2$ for normal operation. These regions contain additional $CO_2$ that would be desirable to transport across an electrolyte, such as for carbon capture. However, the $CO_2$ in such regions is typically not transported across the electrolyte when operating under conventional conditions. By selecting operating conditions with a transference of 0.97 or less, or 0.95 or less, the regions with sufficient $CO_2$ can be used to transport additional $CO_2$ while the depleted regions can operate based on alternative ion transport. This can increase the practical limit for the amount of $CO_2$ captured from a cathode input stream.

One of the advantages of transport of alternative ions across the electrolyte is that the fuel cell can continue to operate, even though a sufficient number of $CO_2$ molecules are not kinetically available. This can allow additional $CO_2$ to be transferred from cathode to anode even though the amount of $CO_2$ present in the cathode would conventionally be considered insufficient for normal fuel cell operation. This can allow the fuel cell to operate with a measured $CO_2$ utilization closer to 100%, while the calculated $CO_2$ utilization (based on current density) can be at least 3% greater than the measured $CO_2$ utilization, or at least 5% greater, or at least 10% greater, or at least 20% greater. It is noted that alternative ion transport can allow a fuel cell to operate with a current density that would correspond to more than 100% calculated $CO_2$ utilization.

Although transport of alternative ions can allow a fuel cell to maintain a target current density, it has further been discovered that transport of alternative ions across the electrolyte can also reduce or minimize the lifetime of a molten carbonate fuel cell. Thus, mitigation of this loss in fuel cell lifetime is desirable. It has been unexpectedly discovered that increasing the open area of the cathode surface and/or decreasing the average cathode gas lateral diffusion length can reduce or minimize the amount of alternative ion transport while performing elevated $CO_2$ capture.

In some aspects, elevated $CO_2$ capture can be defined based on the amount of transference, such as a transference of 0.97 or less, or 0.95 or less, or 0.93 or less, or 0.90 or less. Maintaining an operating condition with transference of 0.97 or less can typically also result in a $CO_2$ concentration in the cathode output stream of 2.0 vol % or less, or 1.5 vol % or less, or 1.0 vol % or less. At higher $CO_2$ concentrations in the cathode output stream, there is typically not sufficient local depletion of $CO_2$ to result in lower transference values.

The presence of elevated $CO_2$ capture can also be indicated by other factors, although such other factors are by themselves typically not a sufficient condition to indicate elevated $CO_2$ capture. For example, when using a lower $CO_2$ concentration cathode input stream, elevated $CO_2$ capture can in some aspects correspond to a $CO_2$ utilization of 70% or more, or 75% or more, or 80% or more, such as up to 95% or possibly still higher. Examples of lower concentration sources of $CO_2$ can correspond to $CO_2$ sources that result in cathode input streams containing 5.0 vol % or less of $CO_2$, or 4.0 vol % or less, such as down to 1.5 vol % or possibly lower. The exhaust from a natural gas turbine is an example of a $CO_2$-containing stream that often has a $CO_2$ content of 5.0 vol % or less of $CO_2$, or 4.0 vol % or less. Additionally or alternately, elevated $CO_2$ capture can correspond to operating conditions where the molten carbonate fuel cell is used to generate a substantial amount of current density, such as 60 $mA/cm^2$ or more, or 80 $mA/cm^2$ or more, or 100 $mA/cm^2$ or more, or 120 $mA/cm^2$ or more, or 150 $mA/cm^2$ or more, or 200 $mA/cm^2$ or more, such as up to 300 $mA/cm^2$ or possibly still higher. It is noted that alternative ion transport can also be indicated by a reduced operating voltage for a fuel cell, as the reaction pathway for alternative ion transport has a lower theoretical voltage than the reaction pathway that uses carbonate ions.

Conventionally, the $CO_2$ concentration in the cathode exhaust of a molten carbonate fuel cell is maintained at a relatively high value, such as 5 vol % $CO_2$ or more, or 10 vol % $CO_2$ or more, or possibly still higher. Additionally, molten carbonate fuel cells are typically operated at $CO_2$ utilization values of 70% or less. When either of these conditions are present, the dominant mechanism for transport of charge across the molten carbonate electrolyte is transport of carbonate ions. While it is possible that transport of alternative ions (such as hydroxide ions) across the electrolyte occurs under such conventional conditions, the amount of alternative ion transport is de minimis, corresponding to 2% or less of the current density (or equivalently, a transference of 0.98 or more).

As an alternative to describing operating conditions in terms of transference, the operating conditions can be described based on measured $CO_2$ utilization and "calculated" $CO_2$ utilization based on average current density. In this discussion, the measured $CO_2$ utilization corresponds to the amount of $CO_2$ that is removed from the cathode input stream. This can be determined, for example, by using gas chromatography to determine the $CO_2$ concentration in the cathode input stream and the cathode output stream. This can also be referred to as the actual $CO_2$ utilization, or simply as the $CO_2$ utilization. In this discussion, the calculated $CO_2$ utilization is defined as the $CO_2$ utilization that would occur if all of the current density generated by the fuel cell was generated based on transport of $CO_3^{2-}$ ions across the electrolyte (i.e., transport of ions based on $CO_2$). The difference in measured $CO_2$ utilization and the calculated $CO_2$ utilization can be used individually to characterize the amount of alternative ion transport, and/or these values can be used to calculate the transference, as described above.

In some aspects, any convenient type of electrolyte suitable for operation of a molten carbonate fuel cell can be used. Many conventional MCFCs use a eutectic carbonate mixture as the carbonate electrolyte, such as a eutectic mixture of 62 mol % lithium carbonate and 38 mol % potassium carbonate (62% $Li_2CO_3$/38% $K_2CO_3$) or a eutectic mixture of 52 mol % lithium carbonate and 48 mol % sodium carbonate (52% $Li_2CO_3$/48% $Na_2CO_3$). Other eutectic mixtures are also available, such as a eutectic mixture of 40 mol % lithium carbonate and 60 mol % potassium carbonate (40% $Li_2CO_3$/60% $K_2CO_3$). While eutectic mixtures of carbonates can be convenient as an electrolyte for various reasons, non-eutectic mixtures of carbonates can also be suitable. Generally, such non-eutectic mixtures can include various combinations of lithium carbonate, sodium carbonate, and/or potassium carbonate. Optionally, lesser amounts of other metal carbonates can be included in the electrolyte as additives, such as other alkali carbonates (rubidium carbonate, cesium carbonate), or other types of metal carbonates such as barium carbonate, bismuth carbonate, lanthanum carbonate, or tantalum carbonate.

Definitions

Figure 2:
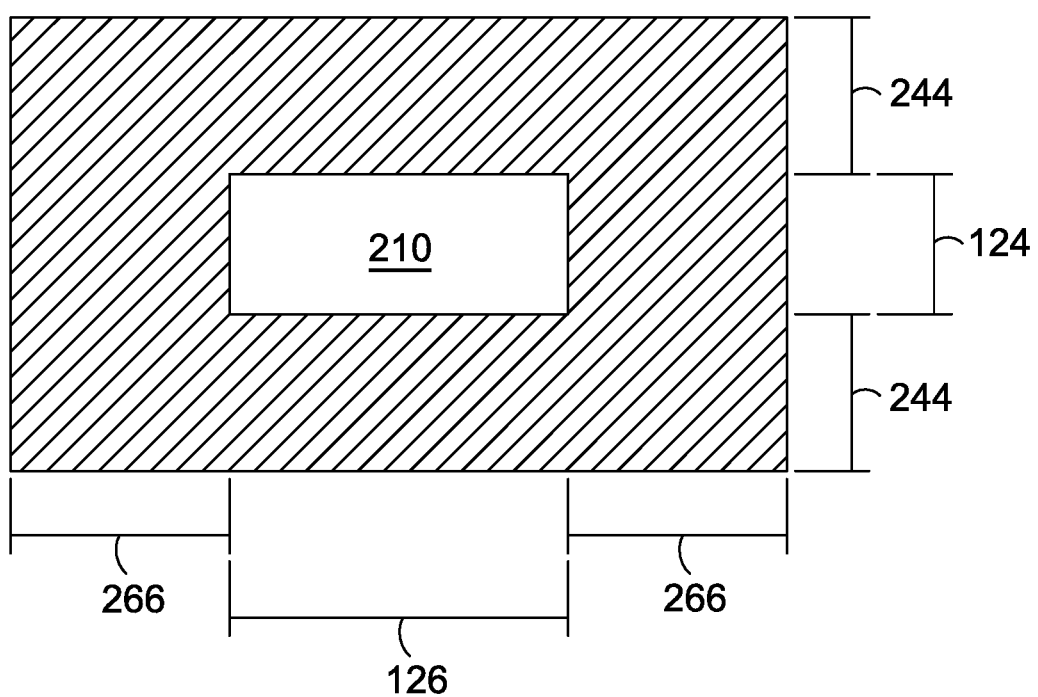
FIG. 2 shows an example of a repeating pattern unit that can be used to represent the cathode collector structure shown in FIG. 1.
Figure 5:
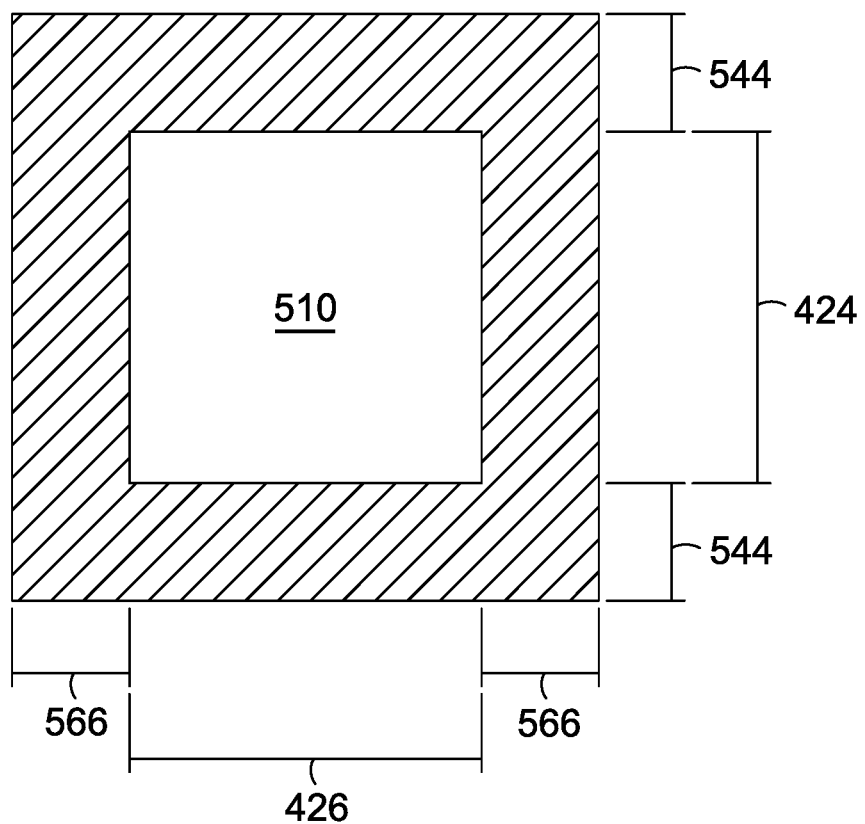
FIG. 5 shows an example of a repeating pattern unit that can be used to represent the cathode collector structure shown in FIG. 4.

Open area and Contact Area: The open area of a cathode surface (adjacent to the cathode current collector) is defined as the percentage of the cathode surface that is not in contact with the cathode current collector. FIG. 2 and FIG. 5 show two examples of repeating units (i.e., unit cells) that can be used to represent the contact area and open area for a cathode surface that is in contact with the plate-like surface of a cathode collector. The example repeat units in FIG. 2 and FIG. 5 correspond to the repeating patterns (unit cells) that can be used to represent the structures shown in FIG. 1 and FIG. 4, respectively. In FIG. 2 and FIG. 5, the dark areas correspond to areas where the collector is in contact with the cathode surface, while the light areas correspond to areas where gas can pass between the cathode and the collector.

As an example of a calculation to determine open area, distance 126 in FIG. 2 can be set to 3.0, distance 266 can be set to 0.75, distance 124 can be set to 1.0, and distance 244 can be set to 0.5. It is noted that adding both distances 244 results in the value of distance 140 (1.5) from FIG. 1. Similarly, adding both distances 266 together results in the value of distance 160 (1.0) from FIG. 1. Based on the distances in FIG. 2, the open area 210 for the configuration shown in FIG. 2 is 33%. This can be determined, for example, by noting that the area of open area 210 is 3.0*1.0=3.0, while the area of the total repeating unit is (0.75+3.0+0.75)*(0.5+1.0+0.5)=9.0. Thus, the open area percentage is 3.0/9.0, or 33%. It is noted that the distances in FIG. 2 are normalized and therefore are in arbitrary length units.

A similar calculation can be used to calculate the open area 510 for the repeat pattern shown in FIG. 5. In FIG. 5, distance 424 can be set to 8.0, distance 544 can be set to 1.0, distance 426 can be set to 8.0, and distance 566 can be set to 1.0. This results in an open area of 64/100, or 64%.

The contact area corresponds to the remaining portion of the cathode surface that does not correspond to open area. Thus, one option for calculating the contact area is to subtract the open area from 100%.

Average cathode gas lateral diffusion length: The average cathode gas lateral diffusion length is defined as the average lateral distance from an open area location on a cathode surface to each point on the cathode surface. For the purposes of this definition, the lateral diffusion length for any point corresponding to an open area location is defined as zero.

The average cathode gas lateral diffusion length can also be calculated for cathode surfaces having the repeating patterns shown in FIG. 2 and FIG. 5, respectively. The same normalized distances shown in FIG. 2 and FIG. 5 can be used, with the end result being multiplied by an appropriate scaling factor to represent a given configuration.

Figure 6:
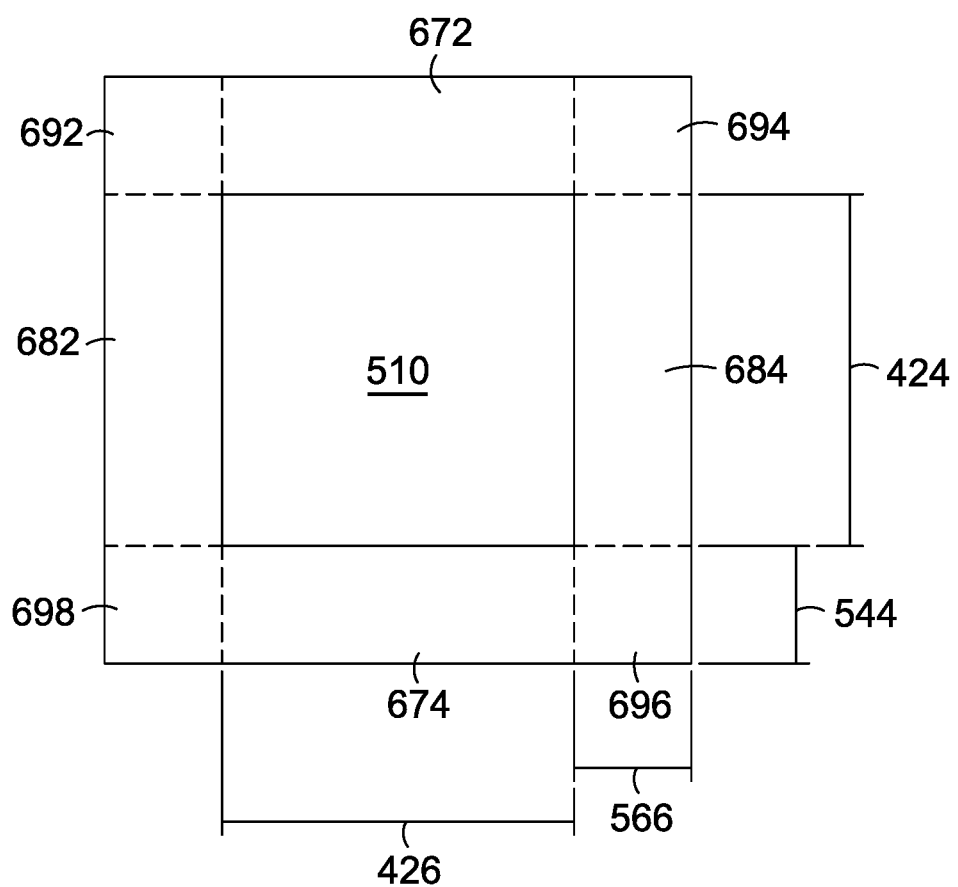
FIG. 6 shows another example of the repeating pattern unit of FIG. 5.

One option for determining the average cathode gas lateral diffusion length can be to directly calculate the value, based on a repeating pattern element, such as by using a commercially available software package. Additionally, relatively good approximate values can be determined in a straightforward manner. FIG. 6 shows another example of the repeating pattern element shown in FIG. 5. (Shading is not used in FIG. 6 to designate open area versus contact area.) In FIG. 6, the region around open area 510 can be divided into several pieces. For lateral areas 672 and 674, the average distance from an open area is simply half of the length of the lateral area, or 0.5. Similarly, for vertical areas 682 and 684, the average distance from an open area is half of the width of the vertical area, or 0.5. For corner areas 692, 694, 696, and 698, an upper limit for the average distance can be determined based on the maximum distance, or the distance from the open area to the top corner of the square. Half of that maximum distance is roughly 0.7, which provides a bounding upper limit for the average distances within corner areas 692, 694, 696, and 696.

The above average distances can then be used to determine the average cathode gas lateral diffusion length by multiplying the average distances by the percentage of the total area corresponding to each distance. Areas 672, 674, 682, and 684 correspond to 32% of the total area of the repeat pattern unit shown in FIG. 6. The corner areas correspond to 4% of the total area. The remaining 64% of the area corresponds to the open area 510, which by definition has a distance of zero. These values can be used to determine an upper limit for the average cathode gas lateral diffusion length of (0.64*0+0.32*0.5+0.04*0.7)=0.188. The 0.188 value can then be multiplied by a scaling factor that is representative of a real system. In this example, the scaling factor described above for FIG. 4 of 0.635 mm can be used. Multiplying 0.188 by a scaling factor of 0.635 mm results in an average cathode gas lateral diffusion length of 0.12 mm. It is noted that based on the assumptions used when calculating the average distance values for corner areas 692, 694, 696, and 698, the value of 0.12 mm represents an upper bound for the actual average cathode gas lateral diffusion length.

The calculation above can also be performed for the repeat pattern shown in FIG. 2. However, instead of determining an upper bound, the estimation for the corners can be used to provide a lower bound. Based on the values in FIG. 2, the lower bound for the average cathode gas lateral diffusion length (in normalized units, without the scaling factor) is 0.21. As described for the configuration in FIG. 1, a representative value for the scaling factor is 0.08 in, or 2.0 mm. Based on a scaling factor of 2.0 mm, the average cathode gas lateral diffusion length would be 0.42 mm.

Average contact area diffusion length: The average contact area diffusion length is defined as the average lateral distance from a contact area location on a cathode surface to each point on the cathode surface. For the purposes of this definition, the contact area diffusion length for any point corresponding to a contact area location is defined as zero. An example of this calculation will be further illustrated below.

Unblocked flow cross section: In various aspects, a cathode collector structure can provide structural support to maintain a distance or gap between the surface of the cathode and the separator plate (such as bipolar plate) that corresponds to the end of a fuel cell. This gap between the cathode and the separator plate corresponds to a cathode gas collection volume that can receive cathode input gas. An unblocked flow cross-section can be defined based on the direction of flow of the cathode input gas within the cathode gas collection volume.

In this discussion, the direction of flow corresponds to the average path between the cathode gas inlet and the cathode gas outlet. The central axis of the cathode gas collection volume is defined as a line passing through the geometric center of the cathode gas collection volume that is roughly parallel to the direction of flow. The flow cross-section corresponds to the average cross-sectional area of the cathode gas collection volume along the direction of flow based on cross-sections that are perpendicular to the central axis. It is noted that the cathode gas collection volume will typically correspond to a parallelpiped, so that the central axis will correspond to a straight line. However, for a cathode gas collection volume having another type of shape, the central axis could potentially correspond to a curved line.

The flow cross-section can potentially include both blocked flow cross-section and unblocked flow cross-section. Examples of potential blocking structures can include, but are not limited to, baffle structures and/or the cathode collector structure. The blocked flow cross-section is defined as the portion (percentage) of the flow cross-section where a line parallel to the central axis will intersect with a solid structure within the cathode gas collection volume. The unblocked flow cross-section is defined as the portion of the flow cross-section where such a parallel line does not intersect with a solid structure within the cathode gas collection volume.

Cathode Collector Configurations with Increased Open Area

Conventionally, a cathode collector structure such as the structure shown in FIG. 1 would be oriented so that plate-like surface 110 is in contact with the cathode surface. In various aspects, instead of using a conventional configuration, a cathode collector (such as the structures shown in FIG. 1 or FIG. 4) can be oriented so that the bottom edges 122 of the loop structures 120 are in contact with the cathode surface, while plate-like surface 110 is in contact with the separator plate.

Figure 7:
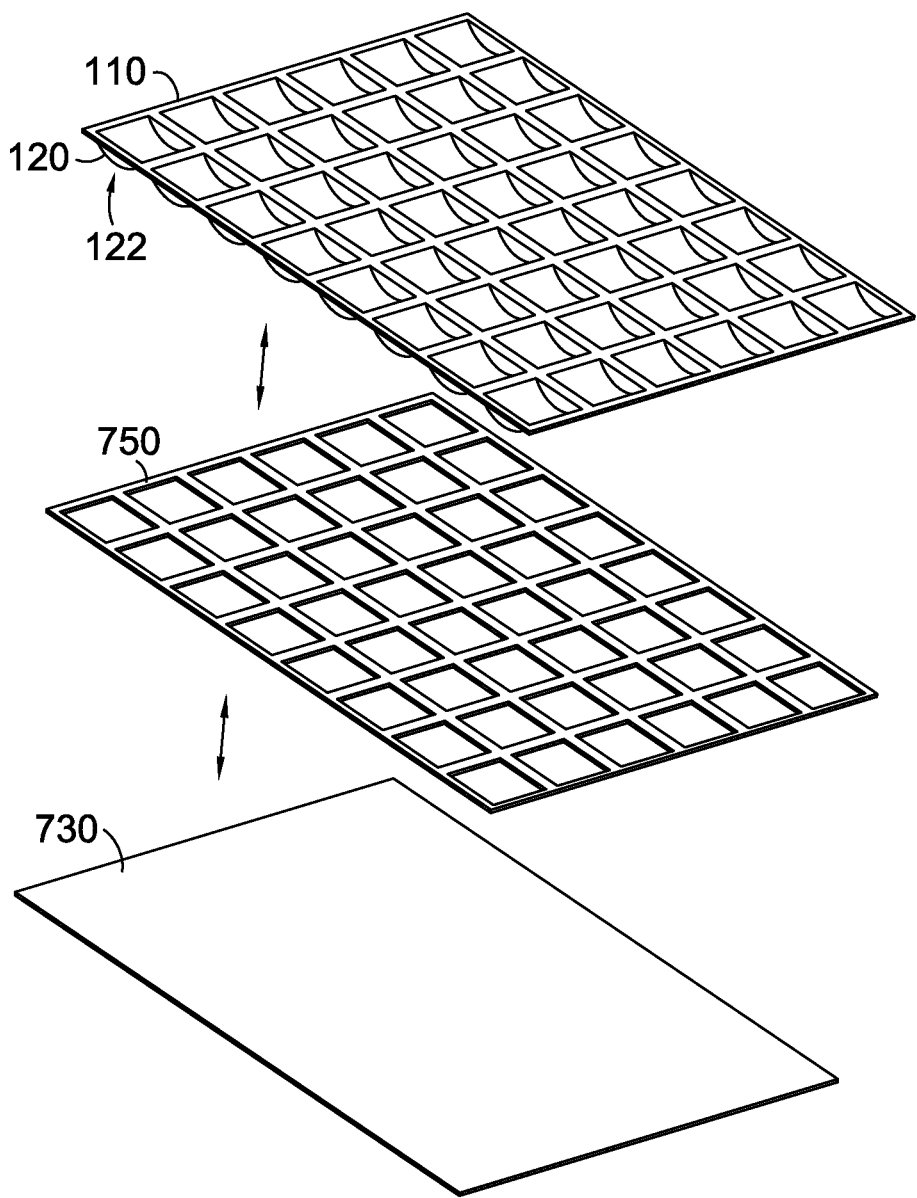
FIG. 7 shows an example of a cathode collector configuration with the loop structures making contact with the cathode surface.

FIG. 7 shows an example of this type of configuration, where the bottom edges 122 of loop structures 120 are in contact with the cathode surface 730. As shown in FIG. 7, having bottom edges 122 of loop structures 120 as the contact points with the cathode surface can substantially increase the open area on the cathode surface. Similarly, the average cathode gas lateral diffusion length can be reduced or minimized by a configuration similar to FIG. 7. However, due to the more limited nature of the electrical contact between the cathode surface and the collector, the average contact area diffusion length can be increased.

Figure 3:
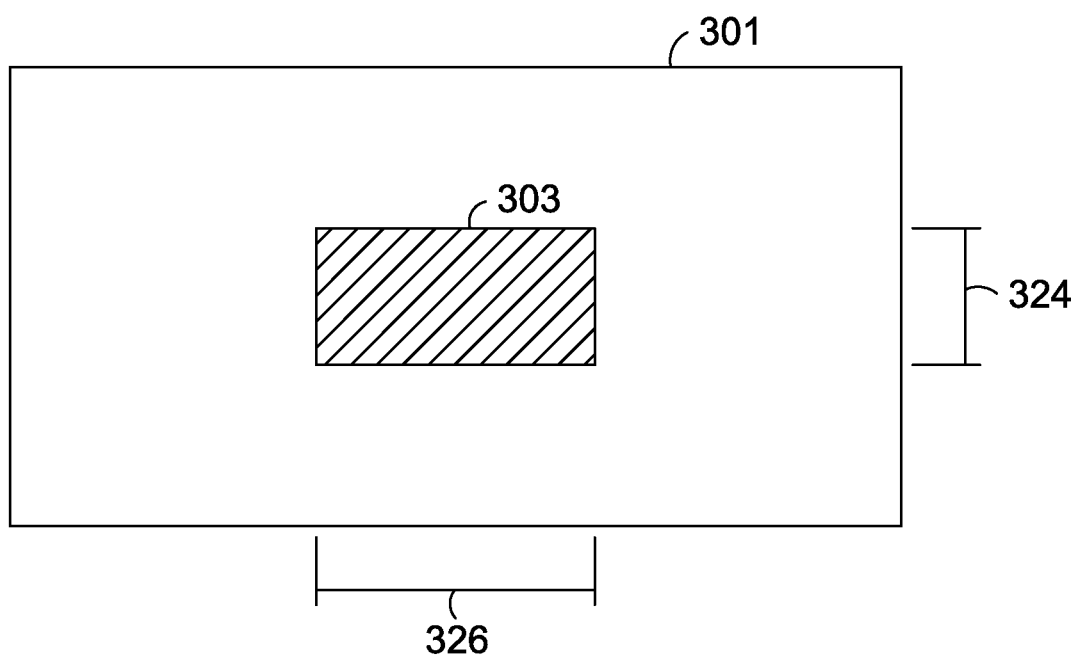
FIG. 3 shows an example of a repeating pattern unit that can be used to represent the cathode collector structure shown in FIG. 1 when the loop structures of the cathode collector are in contact with the cathode surface.

As an example, the cathode collector shown in FIG. 1 could be used in a configuration where the bottom edges 122 of loop structures 120 are in contact with cathode surface 730. In this type of configuration, the repeat pattern for the contact area of the cathode surface with the collector can be represented by FIG. 3. FIG. 3 has the same repeat cell size as the pattern shown in FIG. 2, as represented by square 301. However, most of the repeat pattern corresponds to open area. A central portion 303 of square 301 is shown in dark color, indicating the contact of the bottom edge of a loop structure with the surface of the collector.

In FIG. 3, the height 324 of the central portion 303 is 1.0, or the same as the height 124 of the open area 120 in FIG. 2. The width 326 of the central portion 303 is 1.5, or half of the width 126 of the open area 120 in FIG. 2. The total length and width of unit cell 301 are the same as the pattern shown in FIG. 2. This results in a contact area of 1.5/9.0, or roughly 16%.

Based on the pattern shown in FIG. 3, the average carbonate lateral diffusion length can be determined in a manner similar to the calculation of average cathode gas lateral diffusion length illustrated by FIG. 6. It is noted that the contact area (corresponding to area 303) is defined to have a diffusion length of zero. Based on the pattern shown in FIG. 3, a lower bound for the average contact area diffusion length corresponds to 0.54 in arbitrary units. When multiplied by a scaling factor of 2.0 mm, this results in a lower bound for the average contact area diffusion length of 1.08 mm.

A similar calculation can be performed based on using the cathode collector in FIG. 4 in a configuration where the bottom edges of the loop structures are in contact with the cathode surface. A similar set of assumptions can be made, so that the width of the contact area is half of the open area in FIG. 5 or FIG. 6, while the length of the contact area is the same as the open area in FIG. 5 or FIG. 6. Based on these values, using the collector in FIG. 4 in the configuration of FIG. 7 can result in a contact area of 32% and an upper bound for the average contact area diffusion length of 0.47 (normalized). When multiplied by the scaling factor used for FIG. 4 of 1.27 mm, the resulting average contact area diffusion length is roughly 0.6 mm.

Optionally, when a cathode collector is used with an open area greater than 70% and/or an increased average contact area diffusion length, an additional structure can be included to reduce the average contact area diffusion length. For example, an open mesh screen 750 with small mesh size (roughly 1.0 mm or less average cell width and/or length) can be placed between the cathode surface 730 and the bottom edges 122 of loop structures 120. Because the screen 750 is supported by the cathode surface 730 and/or loop structures 120, the screen 750 does not need to provide structural support, so the percentage of the surface that is covered by the mesh structural material can be relatively low. Additionally, by using a small mesh size, the average contact area diffusion length can be greatly reduced. For example, with a mesh size of 1.0 mm or less, the corresponding average contact area diffusion length can be reduced to 0.3 mm or less.

Figure 15:
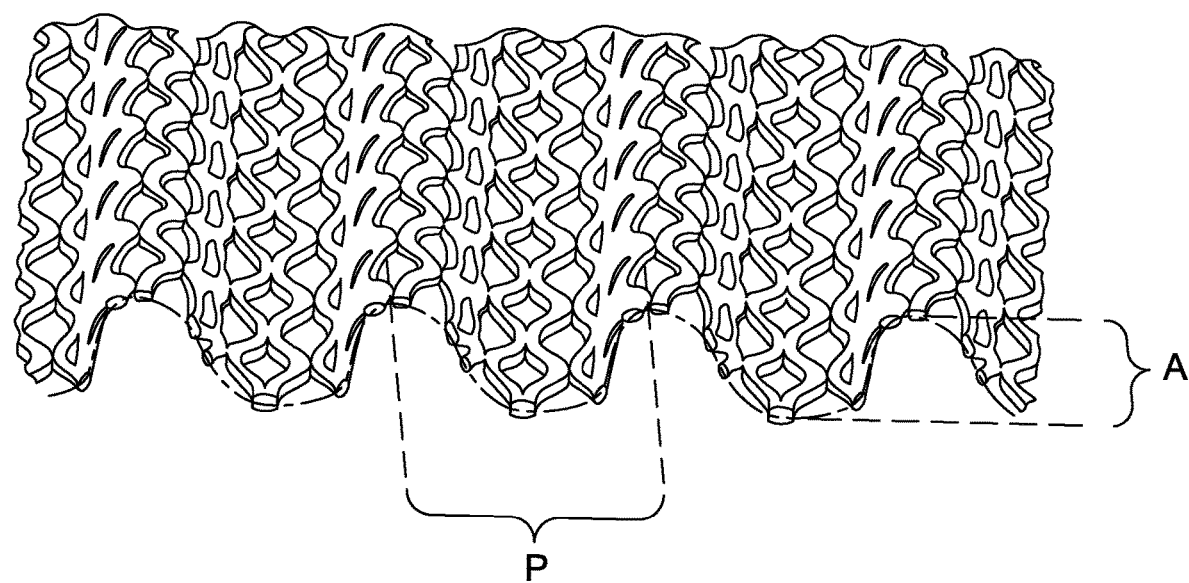
FIG. 15 shows another example of a cathode collector structure.

Still another example of a potential cathode collector structure is shown in FIG. 15. In the structure shown in FIG. 15, the pattern of the cathode collector structure roughly corresponds to a square wave, but rather than using a solid plate, the square wave structure is formed from a mesh screen. This type of configuration can be beneficial for providing increased open surface area at the cathode surface (reduced average cathode gas lateral diffusion length) while also providing a reduced or minimized distance between points of contact between the cathode collector and the cathode surface (reduced average contact area diffusion length). The square wave pattern itself can result in a blocked area of 50% or less. The open mesh structure by itself can also result in a blocked area of 50% or less. By using such an open mesh structure to construct the square wave, a blocked area of 25% or less (and therefore an open area of 75% or more) can be readily achieved. As an example, a cathode collector using the square wave pattern and mesh structure shown in FIG. 15 can be formed where distance "P" (the period for the square wave) corresponds to 0.205 inches (~0.52 cm) while distance "A" (the amplitude for the square wave) corresponds to 0.081 inches (~0.21 cm). Such a cathode collector structure can result in a longest blocked dimension at the cathode surface of 0.010 inches (~0.025 cm).

Textured Cathode Surface

Figure 8:
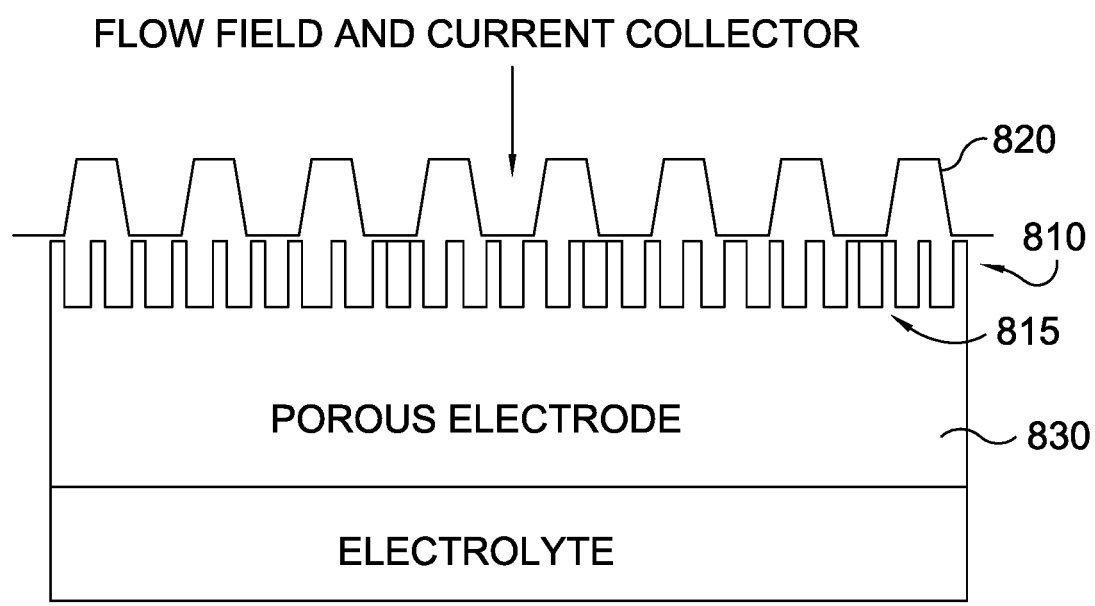
FIG. 8 shows an example of a grooved cathode structure.

In some aspects, another option for increasing the open area at the cathode surface can be based on introducing grooves into the cathode surface. FIG. 8 shows an example of a grooved cathode surface. As shown in FIG. 8, instead of having a planar cathode surface, the upper portion of the cathode surface 810 can include a series of grooves or channels 815. Cathode gas can enter these grooves through open areas and then travel through the grooves to reach locations that otherwise would be covered by the cathode collector 820. The cathode gas in the grooves 815 and/or above the cathode surface 810 can then diffuse into the bulk portion 830 of the cathode to facilitate the molten carbonate fuel cell reaction. When such grooves or channels are present on the cathode surface, the grooves or channels can be considered open area under the definitions provided herein. A groove is considered deep enough to correspond to open area if the groove has a depth of 10 µm or more relative to the plane of contact for the cathode collector. In some aspects, the presence of grooves or channels can increase the open area of a cathode surface by 5% or more relative to the open area for a planar cathode surface in contact with the same collector, or 10% or more, or 15% or more (such as up to a 40% increase or possibly still higher).

In some aspects, the grooves can be interconnected, so that cathode gas entering a groove at one location can potentially travel to any other location within a groove. Alternatively, the grooves can be interconnected into a small plurality of networks, such as less than 10, or less than 5, so that the number of isolated grooves is reduced or minimized. The geometry of the interconnected surface texture can be deep enough to enhance mass transfer but should allow minimal 250 µm regular cathode thickness for sufficient electrochemical reaction sites. The grooves/channels can be spaced at most 250 µm to reduce shadowing effects. The groove/channel width can be 100 µm at the surface where contact is made with the cathode collector, but can decrease to zero reaching the bottom of the grooves/channels. The distance between interconnection points for the grooves/channels can be less than 1000 µm to allow gas mixing under areas that are shadowed by the cathode collector.

The channels or grooves in a cathode surface can be formed in any convenient manner. Examples of suitable processes for forming channels or grooves can include, but are not limited to, machining of a finished cathode surface to form the channels or grooves, pinch rolling a pattern using textured rolls, and/or fabricating a sintered cathode structure including the grooves or channels using a textured mold.

Conditions for Molten Carbonate Fuel Operation with Alternative Ion Transport

In various aspects, the operating conditions for a molten carbonate fuel cell (such as a cell as part of a fuel cell stack) can be selected to correspond to a transference of 0.97 or less, thereby causing the cell to transport both carbonate ion and at least one type of alternative ion across the electrolyte. In addition to transference, operating conditions that can indicate that a molten carbonate fuel cell is operating with transport of alternative ions include, but are not limited to, $CO_2$ concentration for the cathode input stream, the $CO_2$ utilization in the cathode, the current density for the fuel cell, the voltage drop across the cathode, the voltage drop across the anode, and the $O_2$ concentration in the cathode input stream. Additionally, the anode input stream and fuel utilization in the anode can be generally selected to provide the desired current density.

Generally, to cause alternative ion transport, the $CO_2$ concentration in at least a portion of the cathode needs to be sufficiently low while operating the fuel cell to provide a sufficiently high current density. Having a sufficiently low $CO_2$ concentration in the cathode typically corresponds to some combination of a low $CO_2$ concentration in the cathode input flow, a high $CO_2$ utilization, and/or a high average current density. However, such conditions alone are not sufficient to indicate a transference of 0.97 or less, or 0.95 or less.

For example, a molten carbonate fuel cell with a cathode open area of roughly 33% was operated with a $CO_2$ cathode inlet concentration of 19 vol %, 75% $CO_2$ utilization, and 160 mA/cm² of average current density. These conditions corresponded to a difference between calculated $CO_2$ utilization and measured $CO_2$ utilization of less than 1%. Thus, the presence of substantial alternative ion transport/a transference of 0.97 or less, or 0.95 or less, cannot be inferred simply from the presence of a high $CO_2$ utilization and a high average current density.

As another example, a molten carbonate fuel cell with a cathode open area of between 50% and 60% was operated with a $CO_2$ cathode inlet concentration of 4.0 vol %, 89% $CO_2$ utilization, and 100 mA/cm² of current density. These conditions corresponded to a transference of at least 0.97. Thus, the presence of a transference of 0.95 or less/substantial alternative ion transport cannot be inferred simply from the presence of high $CO_2$ utilization in combination with low $CO_2$ concentration in the cathode input stream.

As still another example, a molten carbonate fuel cell with a cathode open area of between 50% and 60% was operated with a $CO_2$ cathode inlet concentration of 13 vol %, 68% $CO_2$ utilization, and 100 mA/cm² of current density. These conditions corresponded to a transference of at least 0.98.

In this discussion, operating an MCFC to transport alternative ions across the electrolyte is defined as operating the MCFC so that more than a de minimis amount of alternative ions are transported. It is possible that minor amounts of alternative ions are transported across an MCFC electrolyte under a variety of conventional conditions. Such alternative ion transport under conventional conditions can correspond to a transference of 0.98 or more, which corresponds to transport of alternative ions corresponding to less than 2.0% of the current density for the fuel cell.

In this discussion, operating an MCFC to cause alternative ion transport is defined as operating an MCFC with a transference of 0.95 or less, so that 5.0% or more of the current density (or, 5.0% or more of the calculated $CO_2$ utilization) corresponds to current density based on transport of alternative ions, or 10% or more, or 20% or more, such as up to 35% or possibly still higher. It is noted that in some aspects, operating with increased open area and/or reduced average cathode gas lateral diffusion length can reduce or minimize the amount of alternative ion transport under conditions that would otherwise result in a transference of 0.95 or less. Thus, by operating with increased open area and/or reduced average cathode gas lateral diffusion length, some operating conditions with elevated $CO_2$ capture/substantial alternative ion transport may correspond to a transference of 0.97 or less.

In this discussion, operating an MCFC to cause substantial alternative ion transport (i.e., to operate with a transference of 0.95 or less, or 0.97 or less with increased open area and/or reduced average cathode gas diffusion length) is further defined to correspond to operating an MCFC with voltage drops across the anode and cathode that are suitable for power generation. The total electrochemical potential difference for the reactions in a molten carbonate fuel cell is ~1.04 V. Due to practical considerations, an MCFC is typically operated to generate current at a voltage near 0.7 V or about 0.8 V. This corresponds to a combined voltage drop across the cathode, electrolyte, and anode of roughly 0.34 V. In order to maintain stable operation, the combined voltage drop across the cathode, electrolyte, and anode can be less than ~0.5 V, so that the resulting current generated by the fuel cell is at a voltage of 0.55 V or more, or 0.6 V or more.

With regard to the anode, one condition for operating with substantial alternative ion transport can be to have an $H_2$ concentration of 8.0 vol % or more, or 10 vol % or more in the region where the substantial alternative ion transport occurs. Depending on the aspect, this could correspond to a region near the anode inlet, a region near the cathode outlet, or a combination thereof. Generally, if the $H_2$ concentration in a region of the anode is too low, there will be insufficient driving force to generate substantial alternative ion transport.

Suitable conditions for the anode can also include providing the anode with $H_2$, a reformable fuel, or a combination thereof; and operating with any convenient fuel utilization that generates a desired current density, including fuel utilizations ranging from 20% to 80%. In some aspects, this can correspond to a traditional fuel utilization amount, such as a fuel utilization of 60% or more, or 70% or more, such as up to 85% or possibly still higher. In other aspects, this can correspond to a fuel utilization selected to provide an anode output stream with an elevated content of $H_2$ and/or an elevated combined content of $H_2$ and CO (i.e., syngas), such as a fuel utilization of 55% or less, or 50% or less, or 40% or less, such as down to 20% or possibly still lower. The $H_2$ content in the anode output stream and/or the combined content of $H_2$ and CO in the anode output stream can be sufficient to allow generation of a desired current density. In some aspects, the $H_2$ content in the anode output stream can be 3.0 vol % or more, or 5.0 vol % or more, or 8.0 vol % or more, such as up to 15 vol % or possibly still higher. Additionally or alternately, the combined amount of $H_2$ and CO in the anode output stream can be 4.0 vol % or more, or 6.0 vol % or more, or 10 vol % or more, such as up to 20 vol % or possibly still higher. Optionally, when the fuel cell is operated with low fuel utilization, the $H_2$ content in the anode output stream can be in a higher range, such as an $H_2$ content of 10 vol % to 25 vol %. In such aspects, the syngas content of the anode output stream can be correspondingly higher, such as a combined $H_2$ and CO content of 15 vol % to 35 vol %. Depending on the aspect, the anode can be operated to increase the amount of electrical energy generated, to increase the amount of chemical energy generated, (i.e., $H_2$ generated by reforming that is available in the anode output stream), or operated using any other convenient strategy that is compatible with operating the fuel cell to cause alternative ion transport.

In addition to having sufficient $H_2$ concentration in the anode, one or more locations within the cathode need to have a low enough $CO_2$ concentration so that the more favorable pathway of carbonate ion transport is not readily available. In some aspects, this can correspond to a having a $CO_2$ concentration in the cathode outlet stream (i.e., cathode exhaust) of 2.0 vol % or less, or 1.0 vol % or less, or 0.8 vol % or less. It is noted that due to variations within the cathode, an average concentration of 2.0 vol % or less (or 1.0 vol % or less, or 0.8 vol % or less) in the cathode exhaust can correspond to a still lower $CO_2$ concentration in localized regions of the cathode. For example, in a cross-flow configuration, at a corner of the fuel cell that is adjacent to the anode inlet and the cathode outlet, the $CO_2$ concentration can be lower than a corner of the same fuel cell that is adjacent to the anode outlet and the cathode outlet. Similar localized variations in $CO_2$ concentration can also occur in fuel cells having a co-current or counter-current configuration.

In addition to having a low concentration of $CO_2$, the localized region of the cathode can also have 1.0 vol % or more of $O_2$, or 2.0 vol % or more. In the fuel cell, $O_2$ is used to form the hydroxide ion that allows for alternative ion transport. If sufficient $O_2$ is not present, the fuel cell will not operate as both the carbonate ion transport and alternative ion transport mechanisms are dependent on $O_2$ availability. With regard to $O_2$ in the cathode input stream, in some aspects this can correspond to an oxygen content of 4.0 vol % to 15 vol %, or 6.0 vol % to 10 vol %.

It has been observed that a sufficient amount of water should also be present for alternative ion transport to occur, such as 1.0 vol % or more, or 2.0 vol % or more. Without being bound by any particular theory, if water is not available in the cathode when attempting to operate with substantial alternative ion transport, the fuel cell appears to degrade at a much more rapid rate than the deactivation rate that is observed due to alternative ion transport with sufficient water available. It is noted that because air is commonly used as an $O_2$ source, and since $H_2O$ is one of the products generated during combustion, a sufficient amount of water is typically available within the cathode.

Due to the non-uniform distribution of cathode gas and/or anode gas during operation of a molten carbonate fuel cell for elevated $CO_2$ capture, it is believed that one or more of the corners and/or edges of the molten carbonate fuel cell will typically have a substantially higher density of alternative ion transport. The one or more corners can correspond to locations where the $CO_2$ concentration in the cathode is lower than average, or a location where the $H_2$ concentration in the anode is greater than average, or a combination thereof.

In this discussion, a fuel cell can correspond to a single cell, with an anode and a cathode separated by an electrolyte. The anode and cathode can receive input gas flows to facilitate the respective anode and cathode reactions for transporting charge across the electrolyte and generating electricity. A fuel cell stack can represent a plurality of cells in an integrated unit. Although a fuel cell stack can include multiple fuel cells, the fuel cells can typically be connected in parallel and can function (approximately) as if they collectively represented a single fuel cell of a larger size. When an input flow is delivered to the anode or cathode of a fuel cell stack, the fuel stack can include flow channels for dividing the input flow between each of the cells in the stack and flow channels for combining the output flows from the individual cells. In this discussion, a fuel cell array can be used to refer to a plurality of fuel cells (such as a plurality of fuel cell stacks) that are arranged in series, in parallel, or in any other convenient manner (e.g., in a combination of series and parallel). A fuel cell array can include one or more stages of fuel cells and/or fuel cell stacks, where the anode/cathode output from a first stage may serve as the anode/cathode input for a second stage. It is noted that the anodes in a fuel cell array do not have to be connected in the same way as the cathodes in the array. For convenience, the input to the first anode stage of a fuel cell array may be referred to as the anode input for the array, and the input to the first cathode stage of the fuel cell array may be referred to as the cathode input to the array. Similarly, the output from the final anode/cathode stage may be referred to as the anode/cathode output from the array.

It should be understood that reference to use of a fuel cell herein typically denotes a "fuel cell stack" composed of individual fuel cells, and more generally refers to use of one or more fuel cell stacks in fluid communication. Individual fuel cell elements (plates) can typically be "stacked" together in a rectangular array called a "fuel cell stack." This fuel cell stack can typically take a feed stream and distribute reactants among all of the individual fuel cell elements and can then collect the products from each of these elements. When viewed as a unit, the fuel cell stack in operation can be taken as a whole even though composed of many (often tens or hundreds) of individual fuel cell elements. These individual fuel cell elements can typically have similar voltages (as the reactant and product concentrations are similar), and the total power output can result from the summation of all of the electrical currents in all of the cell elements, when the elements are electrically connected in series. Stacks can also be arranged in a series arrangement to produce high voltages. A parallel arrangement can boost the current. If a sufficiently large volume fuel cell stack is available to process a given exhaust flow, the systems and methods described herein can be used with a single molten carbonate fuel cell stack. In other aspects of the invention, a plurality of fuel cell stacks may be desirable or needed for a variety of reasons.

For the purposes of this invention, unless otherwise specified, the term "fuel cell" should be understood to also refer to and/or is defined as including a reference to a fuel cell stack composed of a set of one or more individual fuel cell elements for which there is a single input and output, as that is the manner in which fuel cells are typically employed in practice. Similarly, the term fuel cells (plural), unless otherwise specified, should be understood to also refer to and/or is defined as including a plurality of separate fuel cell stacks. In other words, all references within this document, unless specifically noted, can refer interchangeably to the operation of a fuel cell stack as a "fuel cell." For example, the volume of exhaust generated by a commercial scale combustion generator may be too large for processing by a fuel cell (i.e., a single stack) of conventional size. In order to process the full exhaust, a plurality of fuel cells (i.e., two or more separate fuel cells or fuel cell stacks) can be arranged in parallel, so that each fuel cell can process (roughly) an equal portion of the combustion exhaust. Although multiple fuel cells can be used, each fuel cell can typically be operated in a generally similar manner, given its (roughly) equal portion of the combustion exhaust.

Figure 9:
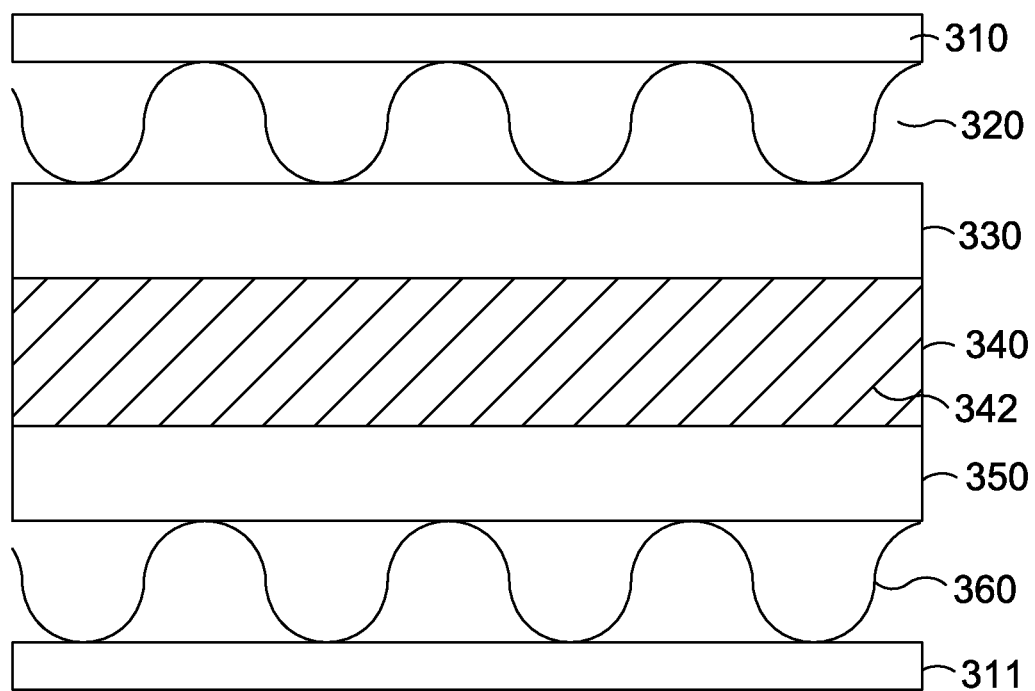
FIG. 9 shows an example of a molten carbonate fuel cell.

Example of Molten Carbonate Fuel Cell Operation: Cross Flow Orientation for Cathode and Anode FIG. 9 shows a general example of a portion of a molten carbonate fuel cell stack. The portion of the stack shown in FIG. 9 corresponds to a fuel cell 301. In order to isolate the fuel cell from adjacent fuel cells in the stack and/or other elements in the stack, the fuel cell includes separator plates 310 and 311. In FIG. 9, the fuel cell 301 includes an anode 330 and a cathode 350 that are separated by an electrolyte matrix 340 that contains an electrolyte 342. In various aspects, cathode 350 can correspond to a dual-layer (or multi-layer) cathode. Anode collector 320 provides electrical contact between anode 330 and the other anodes in the stack, while cathode collector 360 provides similar electrical contact between cathode 350 and the other cathodes in the fuel cell stack. Additionally anode collector 320 allows for introduction and exhaust of gases from anode 330, while cathode collector 360 allows for introduction and exhaust of gases from cathode 350.

During operation, $CO_2$ is passed into the cathode collector 360 along with $O_2$. The $CO_2$ and $O_2$ diffuse into the porous cathode 350 and travel to a cathode interface region near the boundary of cathode 350 and electrolyte matrix 340. In the cathode interface region, a portion of electrolyte 342 can be present in the pores of cathode 350. The $CO_2$ and $O_2$ can be converted near/in the cathode interface region to carbonate ion ($CO_3^{2-}$), which can then be transported across electrolyte 342 (and therefore across electrolyte matrix 340) to facilitate generation of electrical current. In aspects where alternative ion transport is occurring, a portion of the $O_2$ can be converted to an alternative ion, such as a hydroxide ion or a peroxide ion, for transport in electrolyte 342. After transport across the electrolyte 342, the carbonate ion (or alternative ion) can reach an anode interface region near the boundary of electrolyte matrix 340 and anode 330. The carbonate ion can be converted back to $CO_2$ and $H_2O$ in the presence of $H_2$, releasing electrons that are used to form the current generated by the fuel cell. The $H_2$ and/or a hydrocarbon suitable for forming $H_2$ are introduced into anode 330 via anode collector 320.

The flow direction within the anode of a molten carbonate fuel cell can have any convenient orientation relative to the flow direction within a cathode. One option can be to use a cross-flow configuration, so that the flow direction within the anode is roughly at a 90° angle relative to the flow direction within the cathode. This type of flow configuration can have practical benefits, as using a cross-flow configuration can allow the manifolds and/or piping for the anode inlets/outlets to be located on different sides of a fuel cell stack from the manifolds and/or piping for the cathode inlets/outlets.

Figure 10:
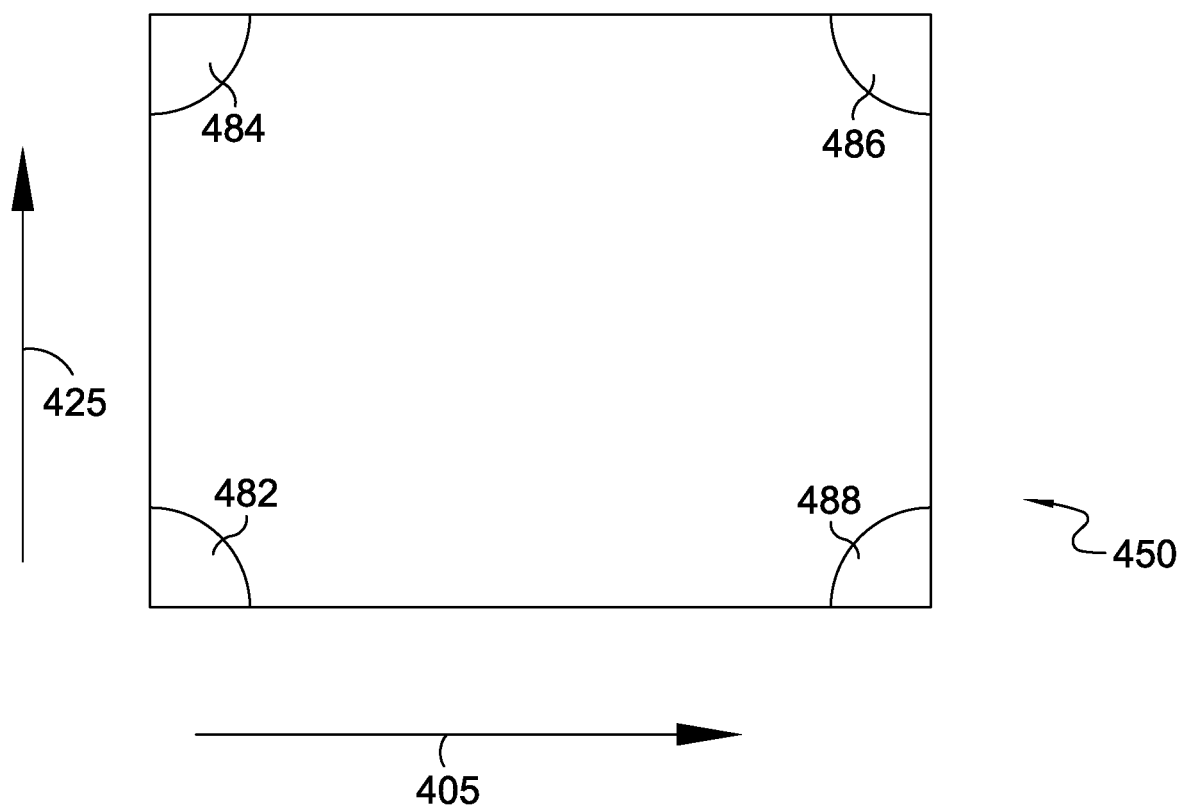
FIG. 10 shows a flow pattern example for a molten carbonate fuel cell with an anode flow direction that is aligned roughly perpendicular to a cathode flow direction.

FIG. 10 schematically shows an example of a top view for a fuel cell cathode, along with arrows indicating the direction of flow within the fuel cell cathode and the corresponding fuel cell anode. In FIG. 10, arrow 405 indicates the direction of flow within cathode 450, while arrow 425 indicates the direction of flow with the anode (not shown).

Because the anode and cathode flows are oriented at roughly 90° relative to each other, the anode and cathode flow patterns can contribute to having different reaction conditions in various parts of the cathode. The different conditions can be illustrated by considering the reaction conditions in the four corners of the cathode. In the illustration in FIG. 10, the reaction conditions described herein are qualitatively similar to the reaction conditions for a fuel cell operating with a $CO_2$ utilization of 75% or more (or 80% or more).

Corner 482 corresponds to a portion of the fuel cell that is close to the entry point for both the cathode input flow and the anode input flow. As a result, the concentration of both $CO_2$ (in the cathode) and $H_2$ (in the anode) is relatively high in corner 482. Based on the high concentrations, it is expected that portions of the fuel cell near corner 482 can operate under expected conditions, with substantially no transport of ions other than carbonate ions across the electrolyte.

Corner 484 corresponds to a portion of the fuel cell that is close to the entry point for the cathode input flow and close to the exit point for the anode output flow. In locations near corner 484, the amount of current density may be limited due to the reduced concentration of $H_2$ in the anode, depending on the fuel utilization. However, sufficient $CO_2$ should be present that any ions transported across the electrolyte substantially correspond to carbonate ions.

Corner 486 corresponds to a portion of the fuel cell that is close to the exit point for the anode output flow and close to the exit point for the cathode output flow. In locations near corner 486, due to the lower concentrations of both $H_2$ (in the anode) and $CO_2$ (in the cathode), little or no current would be expected due to the low driving force for the fuel cell reaction.

Corner 488 corresponds to a portion of the fuel cell that is close to the entry point for the anode input flow and close to the exit point for the cathode output flow. The relatively high availability of hydrogen at locations near corner 488 would be expected to result in substantial current density. However, due to the relatively low concentration of $CO_2$, a substantial amount of transport of hydroxide ions and/or other alternative ions can occur. Depending on the aspect, the substantial amount of alternative ion transport can increase the calculated $CO_2$ utilization by 5% or more, or 10% or more, or 15% or more, or 20% or more. Additionally or alternately, the transference can be 0.97 or less, or 0.95 or less, or 0.90 or less, or 0.85 or less, or 0.80 or less. The transport of substantial amounts of alternative ions across the electrolyte can temporarily allow higher current densities to be maintained at locations near corner 488. However, the transport of alternative ions can also degrade the cathode and/or anode structures, resulting in lower (and possibly no) current density over time at locations near corner 488. It is noted that at lower amounts of alternative ion transport (such as a transference of 0.96 or more, or 0.98 or more), the amount of lifetime degradation is not as severe.

It has been discovered that when alternative ion transport becomes significant at one or more locations within the fuel cell, the fuel cell will quickly begin to degrade. This is believed to be due to the one or more locations degrading and not providing any further current density. As a region(s) stops contributing to the desired current density, the remaining locations in the fuel cell have to operate at higher current densities in order to maintain a constant overall (average) current density for the fuel cell. This can cause the region for transport of alternative ions to grow, resulting in an expanding portion of the fuel cell that degrades and eventually stops working. Alternatively, degradation of a portion of the fuel cell can result in reduced total current density from the cell, which is also undesirable. Operating a fuel cell with increased open area and/or reduced average cathode gas lateral diffusion length can reduce the amount of alternative ion transport that occurs during elevated $CO_2$ capture, allowing for longer fuel cell lifetimes.

Anode Inputs and Outputs

In various aspects, the anode input stream for an MCFC can include hydrogen, a hydrocarbon such as methane, a hydrocarbonaceous or hydrocarbon-like compound that may contain heteroatoms different from C and H, or a combination thereof. The source of the hydrogen/hydrocarbon/hydrocarbon-like compounds can be referred to as a fuel source. In some aspects, most of the methane (or other hydrocarbon, hydrocarbonaceous, or hydrocarbon-like compound) fed to the anode can typically be fresh methane. In this description, a fresh fuel such as fresh methane refers to a fuel that is not recycled from another fuel cell process. For example, methane recycled from the anode outlet stream back to the anode inlet may not be considered "fresh" methane and can instead be described as reclaimed methane.

The fuel source used can be shared with other components, such as a turbine that uses a portion of the fuel source to provide a $CO_2$-containing stream for the cathode input. The fuel source input can include water in a proportion to the fuel appropriate for reforming the hydrocarbon (or hydrocarbon-like) compound in the reforming section that generates hydrogen. For example, if methane is the fuel input for reforming to generate $H_2$, the molar ratio of water to fuel can be from about one to one to about ten to one, such as at least about two to one. A ratio of four to one or greater is typical for external reforming, but lower values can be typical for internal reforming. To the degree that $H_2$ is a portion of the fuel source, in some optional aspects no additional water may be needed in the fuel, as the oxidation of $H_2$ at the anode can tend to produce $H_2O$ that can be used for reforming the fuel. The fuel source can also optionally contain components incidental to the fuel source (e.g., a natural gas feed can contain some content of $CO_2$ as an additional component). For example, a natural gas feed can contain $CO_2$, $N_2$, and/or other inert (noble) gases as additional components. Optionally, in some aspects the fuel source may also contain CO, such as CO from a recycled portion of the anode exhaust. An additional or alternate potential source for CO in the fuel into a fuel cell assembly can be CO generated by steam reforming of a hydrocarbon fuel performed on the fuel prior to entering the fuel cell assembly.

More generally, a variety of types of fuel streams may be suitable for use as an anode input stream for the anode of a molten carbonate fuel cell. Some fuel streams can correspond to streams containing hydrocarbons and/or hydrocarbon-like compounds that may also include heteroatoms different from C and H. In this discussion, unless otherwise specified, a reference to a fuel stream containing hydrocarbons for an MCFC anode is defined to include fuel streams containing such hydrocarbon-like compounds. Examples of hydrocarbon (including hydrocarbon-like) fuel streams include natural gas, streams containing C1-C4 carbon compounds (such as methane or ethane), and streams containing heavier C5+ hydrocarbons (including hydrocarbon-like compounds), as well as combinations thereof. Still other additional or alternate examples of potential fuel streams for use in an anode input can include biogas-type streams, such as methane produced from natural (biological) decomposition of organic material.

In some aspects, a molten carbonate fuel cell can be used to process an input fuel stream, such as a natural gas and/or hydrocarbon stream, with a low energy content due to the presence of diluent compounds. For example, some sources of methane and/or natural gas are sources that can include substantial amounts of either $CO_2$ or other inert molecules, such as nitrogen, argon, or helium. Due to the presence of elevated amounts of $CO_2$ and/or inerts, the energy content of a fuel stream based on the source can be reduced. Using a low energy content fuel for a combustion reaction (such as for powering a combustion-powered turbine) can pose difficulties. However, a molten carbonate fuel cell can generate power based on a low energy content fuel source with a reduced or minimal impact on the efficiency of the fuel cell. The presence of additional gas volume can require additional heat for raising the temperature of the fuel to the temperature for reforming and/or the anode reaction. Additionally, due to the equilibrium nature of the water gas shift reaction within a fuel cell anode, the presence of additional $CO_2$ can have an impact on the relative amounts of $H_2$ and CO present in the anode output. However, the inert compounds otherwise can have only a minimal direct impact on the reforming and anode reactions. The amount of $CO_2$ and/or inert compounds in a fuel stream for a molten carbonate fuel cell, when present, can be at least about 1 vol %, such as at least about 2 vol %, or at least about 5 vol %, or at least about 10 vol %, or at least about 15 vol %, or at least about 20 vol %, or at least about 25 vol %, or at least about 30 vol %, or at least about 35 vol %, or at least about 40 vol %, or at least about 45 vol %, or at least about 50 vol %, or at least about 75 vol %. Additionally or alternately, the amount of $CO_2$ and/or inert compounds in a fuel stream for a molten carbonate fuel cell can be about 90 vol % or less, such as about 75 vol % or less, or about 60 vol % or less, or about 50 vol % or less, or about 40 vol % or less, or about 35 vol % or less.

Yet other examples of potential sources for an anode input stream can correspond to refinery and/or other industrial process output streams. For example, coking is a common process in many refineries for converting heavier compounds to lower boiling ranges. Coking typically produces an off-gas containing a variety of compounds that are gases at room temperature, including CO and various $C_1$-$C_4$ hydrocarbons. This off-gas can be used as at least a portion of an anode input stream. Other refinery off-gas streams can additionally or alternately be suitable for inclusion in an anode input stream, such as light ends ($C_1$-$C_4$) generated during cracking or other refinery processes. Still other suitable refinery streams can additionally or alternately include refinery streams containing CO or $CO_2$ that also contain $H_2$ and/or reformable fuel compounds.

Still other potential sources for an anode input can additionally or alternately include streams with increased water content. For example, an ethanol output stream from an ethanol plant (or another type of fermentation process) can include a substantial portion of $H_2O$ prior to final distillation. Such $H_2O$ can typically cause only minimal impact on the operation of a fuel cell. Thus, a fermentation mixture of alcohol (or other fermentation product) and water can be used as at least a portion of an anode input stream.

Biogas, or digester gas, is another additional or alternate potential source for an anode input. Biogas may primarily comprise methane and $CO_2$ and is typically produced by the breakdown or digestion of organic matter. Anaerobic bacteria may be used to digest the organic matter and produce the biogas. Impurities, such as sulfur-containing compounds, may be removed from the biogas prior to use as an anode input.

The output stream from an MCFC anode can include $H_2O$, $CO_2$, CO, and $H_2$. Optionally, the anode output stream could also have unreacted fuel (such as $H_2$ or $CH_4$) or inert compounds in the feed as additional output components. Instead of using this output stream as a fuel source to provide heat for a reforming reaction or as a combustion fuel for heating the cell, one or more separations can be performed on the anode output stream to separate the $CO_2$ from the components with potential value as inputs to another process, such as $H_2$ or CO. The $H_2$ and/or CO can be used as a syngas for chemical synthesis, as a source of hydrogen for chemical reaction, and/or as a fuel with reduced greenhouse gas emissions.

Cathode Inputs and Outputs

Conventionally, a molten carbonate fuel cell can be operated based on drawing a desired load while consuming some portion of the fuel in the fuel stream delivered to the anode. The voltage of the fuel cell can then be determined by the load, fuel input to the anode, air and $CO_2$ provided to the cathode, and the internal resistances of the fuel cell. The $CO_2$ to the cathode can be conventionally provided in part by using the anode exhaust as at least a part of the cathode input stream. By contrast, the present invention can use separate/different sources for the anode input and cathode input. By removing any direct link between the composition of the anode input flow and the cathode input flow, additional options become available for operating the fuel cell, such as to generate excess synthesis gas, to improve capture of carbon dioxide, and/or to improve the total efficiency (electrical plus chemical power) of the fuel cell, among others.

In various aspects, an MCFC can be operated to cause alternative ion transport across the electrolyte for the fuel cell. In order to cause alternative ion transport, the $CO_2$ content of the cathode input stream can be 5.0 vol % or less, or 4.0 vol % or less, such as 1.5 vol % to 5.0 vol %, or 1.5 vol % to 4.0 vol %, or 2.0 vol % to 5.0 vol %, or 2.0 vol % to 4.0 vol %.

One example of a suitable $CO_2$-containing stream for use as a cathode input flow can be an output or exhaust flow from a combustion source. Examples of combustion sources include, but are not limited to, sources based on combustion of natural gas, combustion of coal, and/or combustion of other hydrocarbon-type fuels (including biologically derived fuels). Additional or alternate sources can include other types of boilers, fired heaters, furnaces, and/or other types of devices that burn carbon-containing fuels in order to heat another substance (such as water or air).

Other potential sources for a cathode input stream can additionally or alternatively include sources of bio-produced $CO_2$. This can include, for example, $CO_2$ generated during processing of bio-derived compounds, such as $CO_2$ generated during ethanol production. An additional or alternate example can include $CO_2$ generated by combustion of a bio-produced fuel, such as combustion of lignocellulose. Still other additional or alternate potential $CO_2$ sources can correspond to output or exhaust streams from various industrial processes, such as $CO_2$-containing streams generated by plants for manufacture of steel, cement, and/or paper.

Yet another additional or alternate potential source of $CO_2$ can be $CO_2$-containing streams from a fuel cell. The $CO_2$-containing stream from a fuel cell can correspond to a cathode output stream from a different fuel cell, an anode output stream from a different fuel cell, a recycle stream from the cathode output to the cathode input of a fuel cell, and/or a recycle stream from an anode output to a cathode input of a fuel cell. For example, an MCFC operated in standalone mode under conventional conditions can generate a cathode exhaust with a $CO_2$ concentration of at least about 5 vol %. Such a $CO_2$-containing cathode exhaust could be used as a cathode input for an MCFC operated according to an aspect of the invention. More generally, other types of fuel cells that generate a $CO_2$ output from the cathode exhaust can additionally or alternatively be used, as well as other types of $CO_2$-containing streams not generated by a "combustion" reaction and/or by a combustion-powered generator. Optionally but preferably, a $CO_2$-containing stream from another fuel cell can be from another molten carbonate fuel cell. For example, for molten carbonate fuel cells connected in series with respect to the cathodes, the output from the cathode for a first molten carbonate fuel cell can be used as the input to the cathode for a second molten carbonate fuel cell.

In addition to $CO_2$, a cathode input stream can include $O_2$ to provide the components necessary for the cathode reaction. Some cathode input streams can be based on having air as a component. For example, a combustion exhaust stream can be formed by combusting a hydrocarbon fuel in the presence of air. Such a combustion exhaust stream, or another type of cathode input stream having an oxygen content based on inclusion of air, can have an oxygen content of about 20 vol % or less, such as about 15 vol % or less, or about 10 vol % or less. Additionally or alternatively, the oxygen content of the cathode input stream can be at least about 4 vol %, such as at least about 6 vol %, or at least about 8 vol %. More generally, a cathode input stream can have a suitable content of oxygen for performing the cathode reaction. In some aspects, this can correspond to an oxygen content of about 5 vol % to about 15 vol %, such as from about 7 vol % to about 9 vol %. For many types of cathode input streams, the combined amount of $CO_2$ and $O_2$ can correspond to less than about 21 vol % of the input stream, such as less than about 15 vol % of the stream or less than about 10 vol % of the stream. An air stream containing oxygen can be combined with a $CO_2$ source that has low oxygen content. For example, the exhaust stream generated by burning coal may include a low oxygen content that can be mixed with air to form a cathode inlet stream.

In addition to $CO_2$ and $O_2$, a cathode input stream can also be composed of inert/non-reactive species such as $N_2$, $H_2O$, and other typical oxidant (air) components. For example, for a cathode input derived from an exhaust from a combustion reaction, if air is used as part of the oxidant source for the combustion reaction, the exhaust gas can include typical components of air such as $N_2$, $H_2O$, and other compounds in minor amounts that are present in air. Depending on the nature of the fuel source for the combustion reaction, additional species present after combustion based on the fuel source may include one or more of $H_2O$, oxides of nitrogen (NOx) and/or sulfur (SOx), and other compounds either present in the fuel and/or that are partial or complete combustion products of compounds present in the fuel, such as CO. These species may be present in amounts that do not poison the cathode catalyst surfaces though they may reduce the overall cathode activity. Such reductions in performance may be acceptable, or species that interact with the cathode catalyst may be reduced to acceptable levels by known pollutant removal technologies.

The amount of $O_2$ present in a cathode input stream (such as an input cathode stream based on a combustion exhaust) can advantageously be sufficient to provide the oxygen needed for the cathode reaction in the fuel cell. Thus, the volume percentage of $O_2$ can advantageously be at least 0.5 times the amount of $CO_2$ in the exhaust. Optionally, as necessary, additional air can be added to the cathode input to provide sufficient oxidant for the cathode reaction. When some form of air is used as the oxidant, the amount of $N_2$ in the cathode exhaust can be at least about 78 vol %, e.g., at least about 88 vol %, and/or about 95 vol % or less. In some aspects, the cathode input stream can additionally or alternately contain compounds that are generally viewed as contaminants, such as $H_2S$ or $NH_3$. In other aspects, the cathode input stream can be cleaned to reduce or minimize the content of such contaminants.

A suitable temperature for operation of an MCFC can be between about 450° C. and about 750° C., such as at least about 500° C., e.g., with an inlet temperature of about 550° C. and an outlet temperature of about 625° C. Prior to entering the cathode, heat can be added to or removed from the cathode input stream, if desired, e.g., to provide heat for other processes, such as reforming the fuel input for the anode. For example, if the source for the cathode input stream is a combustion exhaust stream, the combustion exhaust stream may have a temperature greater than a desired temperature for the cathode inlet. In such an aspect, heat can be removed from the combustion exhaust prior to use as the cathode input stream. Alternatively, the combustion exhaust could be at a very low temperature, for example after a wet gas scrubber on a coal-fired boiler, in which case the combustion exhaust can be below about 100° C. Alternatively, the combustion exhaust could be from the exhaust of a gas turbine operated in combined cycle mode, in which the gas can be cooled by raising steam to run a steam turbine for additional power generation. In this case, the gas can be below about 50° C. Heat can be added to a combustion exhaust that is cooler than desired.

Additional Molten Carbonate Fuel Cell Operating Strategies

In some aspects, when operating an MCFC to cause alternative ion transport, the anode of the fuel cell can be operated at a traditional fuel utilization value of roughly 60% to 80%. When attempting to generate electrical power, operating the anode of the fuel cell at a relatively high fuel utilization can be beneficial for improving electrical efficiency (i.e., electrical energy generated per unit of chemical energy consumed by the fuel cell).

In some aspects, it may be beneficial to reduce the electrical efficiency of the fuel cell in order to provide other benefits, such as an increase in the amount of $H_2$ provided in the anode output flow. This can be beneficial, for example, if it is desirable to consume excess heat generated in the fuel cell (or fuel cell stack) by performing additional reforming and/or performing another endothermic reaction. For example, a molten carbonate fuel cell can be operated to provide increased production of syngas and/or hydrogen. The heat required for performing the endothermic reforming reaction can be provided by the exothermic electrochemical reaction in the anode for electricity generation. Rather than attempting to transport the heat generated by the exothermic fuel cell reaction(s) away from the fuel cell, this excess heat can be used in situ as a heat source for reforming and/or another endothermic reaction. This can result in more efficient use of the heat energy and/or a reduced need for additional external or internal heat exchange. This efficient production and use of heat energy, essentially in-situ, can reduce system complexity and components while maintaining advantageous operating conditions. In some aspects, the amount of reforming or other endothermic reaction can be selected to have an endothermic heat requirement comparable to, or even greater than, the amount of excess heat generated by the exothermic reaction(s) rather than significantly less than the heat requirement typically described in the prior art.

Additionally or alternately, the fuel cell can be operated so that the temperature differential between the anode inlet and the anode outlet can be negative rather than positive. Thus, instead of having a temperature increase between the anode inlet and the anode outlet, a sufficient amount of reforming and/or other endothermic reaction can be performed to cause the output stream from the anode outlet to be cooler than the anode inlet temperature. Further additionally or alternately, additional fuel can be supplied to a heater for the fuel cell and/or an internal reforming stage (or other internal endothermic reaction stage) so that the temperature differential between the anode input and the anode output can be smaller than the expected difference based on the relative demand of the endothermic reaction(s) and the combined exothermic heat generation of the cathode combustion reaction and the anode reaction for generating electrical power. In aspects where reforming is used as the endothermic reaction, operating a fuel cell to reform excess fuel can allow for production of increased synthesis gas and/or increased hydrogen relative to conventional fuel cell operation while minimizing the system complexity for heat exchange and reforming. The additional synthesis gas and/or additional hydrogen can then be used in a variety of applications, including chemical synthesis processes and/or collection/repurposing of hydrogen for use as a "clean" fuel.

The amount of heat generated per mole of hydrogen oxidized by the exothermic reaction at the anode can be substantially larger than the amount of heat consumed per mole of hydrogen generated by the reforming reaction. The net reaction for hydrogen in a molten carbonate fuel cell ($H_2+\frac{1}{2}O_2 \Rightarrow H_2O$) can have an enthalpy of reaction of about −285 kJ/mol of hydrogen molecules. At least a portion of this energy can be converted to electrical energy within the fuel cell. However, the difference (approximately) between the enthalpy of reaction and the electrical energy produced by the fuel cell can become heat within the fuel cell. This quantity of energy can alternatively be expressed as the current density (current per unit area) for the cell multiplied by the difference between the theoretical maximum voltage of the fuel cell and the actual voltage, or <current density>* (Vmax−Vact). This quantity of energy is defined as the "waste heat" for a fuel cell. As an example of reforming, the enthalpy of reforming for methane ($CH_4 + 2H_2O => 4H_2 + CO_2$) can be about 250 kJ/mol of methane, or about 62 kJ/mol of hydrogen molecules. From a heat balance standpoint, each hydrogen molecule electrochemically oxidized can generate sufficient heat to generate more than one hydrogen molecule by reforming. In a conventional configuration, this excess heat can result in a substantial temperature difference from anode inlet to anode outlet. Instead of allowing this excess heat to be used for increasing the temperature in the fuel cell, the excess heat can be consumed by performing a matching amount of the reforming reaction. The excess heat generated in the anode can be supplemented with the excess heat generated by the combustion reaction in the fuel cell. More generally, the excess heat can be consumed by performing an endothermic reaction in the fuel cell anode and/or in an endothermic reaction stage heat integrated with the fuel cell.

Depending on the aspect, the amount of reforming and/or other endothermic reaction can be selected relative to the amount of hydrogen reacted in the anode in order to achieve a desired thermal ratio for the fuel cell. As used herein, the "thermal ratio" is defined as the heat produced by exothermic reactions in a fuel cell assembly (including exothermic reactions in both the anode and cathode) divided by the endothermic heat demand of reforming reactions occurring within the fuel cell assembly. Expressed mathematically, the thermal ratio (TH)=$Q_{EX}/Q_{EN}$, where $Q_{EX}$ is the sum of heat produced by exothermic reactions and $Q_{EN}$ is the sum of heat consumed by the endothermic reactions occurring within the fuel cell. Note that the heat produced by the exothermic reactions can correspond to any heat due to reforming reactions, water gas shift reactions, combustion reactions (i.e., oxidation of fuel compounds) in the cathode, and/or the electrochemical reactions in the cell. The heat generated by the electrochemical reactions can be calculated based on the ideal electrochemical potential of the fuel cell reaction across the electrolyte minus the actual output voltage of the fuel cell. For example, the ideal electrochemical potential of the reaction in a MCFC is believed to be about 1.04 V based on the net reaction that occurs in the cell. During operation of the MCFC, the cell can typically have an output voltage less than 1.04 V due to various losses. For example, a common output/operating voltage can be about 0.7 V. The heat generated can be equal to the electrochemical potential of the cell (i.e., ~1.04 V) minus the operating voltage. For example, the heat produced by the electrochemical reactions in the cell can be ~0.34 V when the output voltage of ~0.7 V is attained in the fuel cell. Thus, in this scenario, the electrochemical reactions would produce ~0.7 V of electricity and ~0.34 V of heat energy. In such an example, the ~0.7 V of electrical energy is not included as part of $Q_{EX}$. In other words, heat energy is not electrical energy.

In various aspects, a thermal ratio can be determined for any convenient fuel cell structure, such as a fuel cell stack, an individual fuel cell within a fuel cell stack, a fuel cell stack with an integrated reforming stage, a fuel cell stack with an integrated endothermic reaction stage, or a combination thereof. The thermal ratio may also be calculated for different units within a fuel cell stack, such as an assembly of fuel cells or fuel cell stacks. For example, the thermal ratio may be calculated for a fuel cell (or a plurality of fuel cells) within a fuel cell stack along with integrated reforming stages and/or integrated endothermic reaction stage elements in sufficiently close proximity to the fuel cell(s) to be integrated from a heat integration standpoint.

From a heat integration standpoint, a characteristic width in a fuel cell stack can be the height of an individual fuel cell stack element. It is noted that the separate reforming stage and/or a separate endothermic reaction stage could have a different height in the stack than a fuel cell. In such a scenario, the height of a fuel cell element can be used as the characteristic height. In this discussion, an integrated endothermic reaction stage can be defined as a stage heat integrated with one or more fuel cells, so that the integrated endothermic reaction stage can use the heat from the fuel cells as a heat source for reforming. Such an integrated endothermic reaction stage can be defined as being positioned less than 10 times the height of a stack element from fuel cells providing heat to the integrated stage. For example, an integrated endothermic reaction stage (such as a reforming stage) can be positioned less than 10 times the height of a stack element from any fuel cells that are heat integrated, or less than 8 times the height of a stack element, or less than 5 times the height of a stack element, or less than 3 times the height of a stack element. In this discussion, an integrated reforming stage and/or integrated endothermic reaction stage that represents an adjacent stack element to a fuel cell element is defined as being about one stack element height or less away from the adjacent fuel cell element.

A thermal ratio of about 1.3 or less, or about 1.15 or less, or about 1.0 or less, or about 0.95 or less, or about 0.90 or less, or about 0.85 or less, or about 0.80 or less, or about 0.75 of less, can be lower than the thermal ratio typically sought in use of MCFC fuel cells. In aspects of the invention, the thermal ratio can be reduced to increase and/or optimize syngas generation, hydrogen generation, generation of another product via an endothermic reaction, or a combination thereof.

In various aspects of the invention, the operation of the fuel cells can be characterized based on a thermal ratio. Where fuel cells are operated to have a desired thermal ratio, a molten carbonate fuel cell can be operated to have a thermal ratio of about 1.5 or less, for example about 1.3 or less, or about 1.15 or less, or about 1.0 or less, or about 0.95 or less, or about 0.90 or less, or about 0.85 or less, or about 0.80 or less, or about 0.75 or less. Additionally or alternately, the thermal ratio can be at least about 0.25, or at least about 0.35, or at least about 0.45, or at least about 0.50. Further additionally or alternately, in some aspects, the fuel cell can be operated to have a temperature rise between the anode input and anode output of about 40° C. or less, such as about 20° C. or less, or about 10° C. or less. Still further additionally or alternately, the fuel cell can be operated to have an anode outlet temperature that is from about 10° C. lower to about 10° C. higher than the temperature of the anode inlet. Yet further additionally or alternately, the fuel cell can be operated to have an anode inlet temperature greater than the anode outlet temperature, such as at least about 5° C. greater, or at least about 10° C. greater, or at least about 20° C. greater, or at least about 25° C. greater. Still further additionally or alternately, the fuel cell can be operated to have an anode inlet temperature greater than the anode outlet temperature by about 100° C. or less, or about 80° C. or less, or about 60° C. or less, or about 50° C. or less, or about 40° C. or less, or about 30° C. or less, or about 20° C. or less.

Operating a fuel cell with a thermal ratio of less than 1 can cause a temperature drop across the fuel cell. In some aspects, the amount of reforming and/or other endothermic reaction may be limited so that a temperature drop from the anode inlet to the anode outlet can be about 100° C. or less, such as about 80° C. or less, or about 60° C. or less, or about 50° C. or less, or about 40° C. or less, or about 30° C. or less, or about 20° C. or less. Limiting the temperature drop from the anode inlet to the anode outlet can be beneficial, for example, for maintaining a sufficient temperature to allow complete or substantially complete conversion of fuels (by reforming) in the anode. In other aspects, additional heat can be supplied to the fuel cell (such as by heat exchange or combustion of additional fuel) so that the anode inlet temperature is greater than the anode outlet temperature by less than about 100° C. or less, such as about 80° C. or less, or about 60° C. or less, or about 50° C. or less, or about 40° C. or less, or about 30° C. or less, or about 20° C. or less, due to a balancing of the heat consumed by the endothermic reaction and the additional external heat supplied to the fuel cell.

The amount of reforming can additionally or alternately be dependent on the availability of a reformable fuel. For example, if the fuel only comprised $H_2$, no reformation would occur because $H_2$ is already reformed and is not further reformable. The amount of "syngas produced" by a fuel cell can be defined as a difference in the lower heating value (LHV) of syngas in the anode input versus an LHV of syngas in the anode output. Syngas produced LHV (sg net)=(LHV(sg out)−LHV(sg in)), where LHV(sg in) and LHV(sg out) refer to the LHV of the syngas in the anode inlet and syngas in the anode outlet streams or flows, respectively. A fuel cell provided with a fuel containing substantial amounts of $H_2$ can be limited in the amount of potential syngas production, since the fuel contains substantial amounts of already reformed $H_2$, as opposed to containing additional reformable fuel. The lower heating value is defined as the enthalpy of combustion of a fuel component to vapor phase, fully oxidized products (i.e., vapor phase $CO_2$ and $H_2O$ product). For example, any $CO_2$ present in an anode input stream does not contribute to the fuel content of the anode input, since $CO_2$ is already fully oxidized. For this definition, the amount of oxidation occurring in the anode due to the anode fuel cell reaction is defined as oxidation of $H_2$ in the anode as part of the electrochemical reaction in the anode.

An example of a method for operating a fuel cell with a reduced thermal ratio can be a method where excess reforming of fuel is performed in order to balance the generation and consumption of heat in the fuel cell and/or consume more heat than is generated. Reforming a reformable fuel to form $H_2$ and/or CO can be an endothermic process, while the anode electrochemical oxidation reaction and the cathode combustion reaction(s) can be exothermic. During conventional fuel cell operation, the amount of reforming needed to supply the feed components for fuel cell operation can typically consume less heat than the amount of heat generated by the anode oxidation reaction. For example, conventional operation at a fuel utilization of about 70% or about 75% produces a thermal ratio substantially greater than 1, such as a thermal ratio of at least about 1.4 or greater, or 1.5 or greater. As a result, the output streams for the fuel cell can be hotter than the input streams. Instead of this type of conventional operation, the amount of fuel reformed in the reforming stages associated with the anode can be increased. For example, additional fuel can be reformed so that the heat generated by the exothermic fuel cell reactions can either be (roughly) balanced by the heat consumed in reforming and/or consume more heat than is generated. This can result in a substantial excess of hydrogen relative to the amount oxidized in the anode for electrical power generation and result in a thermal ratio of about 1.0 or less, such as about 0.95 or less, or about 0.90 or less, or about 0.85 or less, or about 0.80 or less, or about 0.75 or less.

Either hydrogen or syngas can be withdrawn from the anode exhaust as a chemical energy output. Hydrogen can be used as a clean fuel without generating greenhouse gases when it is burned or combusted. Instead, for hydrogen generated by reforming of hydrocarbons (or hydrocarbonaceous compounds), the $CO_2$ will have already been "captured" in the anode loop. Additionally, hydrogen can be a valuable input for a variety of refinery processes and/or other synthesis processes. Syngas can also be a valuable input for a variety of processes. In addition to having fuel value, syngas can be used as a feedstock for producing other higher value products, such as by using syngas as an input for Fischer-Tropsch synthesis and/or methanol synthesis processes.

In some aspects, the reformable hydrogen content of reformable fuel in the input stream delivered to the anode and/or to a reforming stage associated with the anode can be at least about 50% greater than the net amount of hydrogen reacted at the anode, such as at least about 75% greater or at least about 100% greater. Additionally or alternately, the reformable hydrogen content of fuel in the input stream delivered to the anode and/or to a reforming stage associated with the anode can be at least about 50% greater than the net amount of hydrogen reacted at the anode, such as at least about 75% greater or at least about 100% greater. In various aspects, a ratio of the reformable hydrogen content of the reformable fuel in the fuel stream relative to an amount of hydrogen reacted in the anode can be at least about 1.5:1, or at least about 2.0:1, or at least about 2.5:1, or at least about 3.0:1. Additionally or alternately, the ratio of reformable hydrogen content of the reformable fuel in the fuel stream relative to the amount of hydrogen reacted in the anode can be about 20:1 or less, such as about 15:1 or less, or about 10:1 or less. In one aspect, it is contemplated that less than 100% of the reformable hydrogen content in the anode inlet stream can be converted to hydrogen. For example, at least about 80% of the reformable hydrogen content in an anode inlet stream can be converted to hydrogen in the anode and/or in an associated reforming stage(s), such as at least about 85%, or at least about 90%. Additionally or alternately, the amount of reformable fuel delivered to the anode can be characterized based on the lower heating value (LHV) of the reformable fuel relative to the LHV of the hydrogen oxidized in the anode. This can be referred to as a reformable fuel surplus ratio. In various aspects, the reformable fuel surplus ratio can be at least about 2.0, such as at least about 2.5, or at least about 3.0, or at least about 4.0. Additionally or alternately, the reformable fuel surplus ratio can be about 25.0 or less, such as about 20.0 or less, or about 15.0 or less, or about 10.0 or less.

EXAMPLE 1

Two molten carbonate fuel cells were used to determine the impact of increases in open area on fuel cell performance under conventional operating conditions and under elevated $CO_2$ utilization conditions. A first molten carbonate fuel cell corresponded to a conventional configuration with a cathode surface having an open area of roughly 33%. The second molten carbonate fuel cell had an open area of greater than 45%.

The two cells were operated under two sets of operating conditions. Under a first condition, the fuel cells were operated under conditions corresponding to a $CO_2$ utilization of 40% with a cathode input feed that contained 30 mol % of $CO_2$. Under the second condition, the fuel cells were operated at an apparent $CO_2$ utilization of 90% (as determined based on current density) and a cathode input feed including 4% $CO_2$.

At the first operating condition, the difference in voltage between the fuel cell with an open area of 33% and the fuel cell with an open area of 45% was relatively small, corresponding to a difference of roughly 7 mV. By contrast, at the second operating condition corresponding to elevated $CO_2$ utilization, the fuel cell with an open area of greater than 45% had an operating voltage that was 80 mV higher than the fuel cell with an open area of 33%. Additionally, the actual $CO_2$ utilization was substantially higher for the fuel cell with an open area of greater than 45%.

EXAMPLE 2

Figure 11:
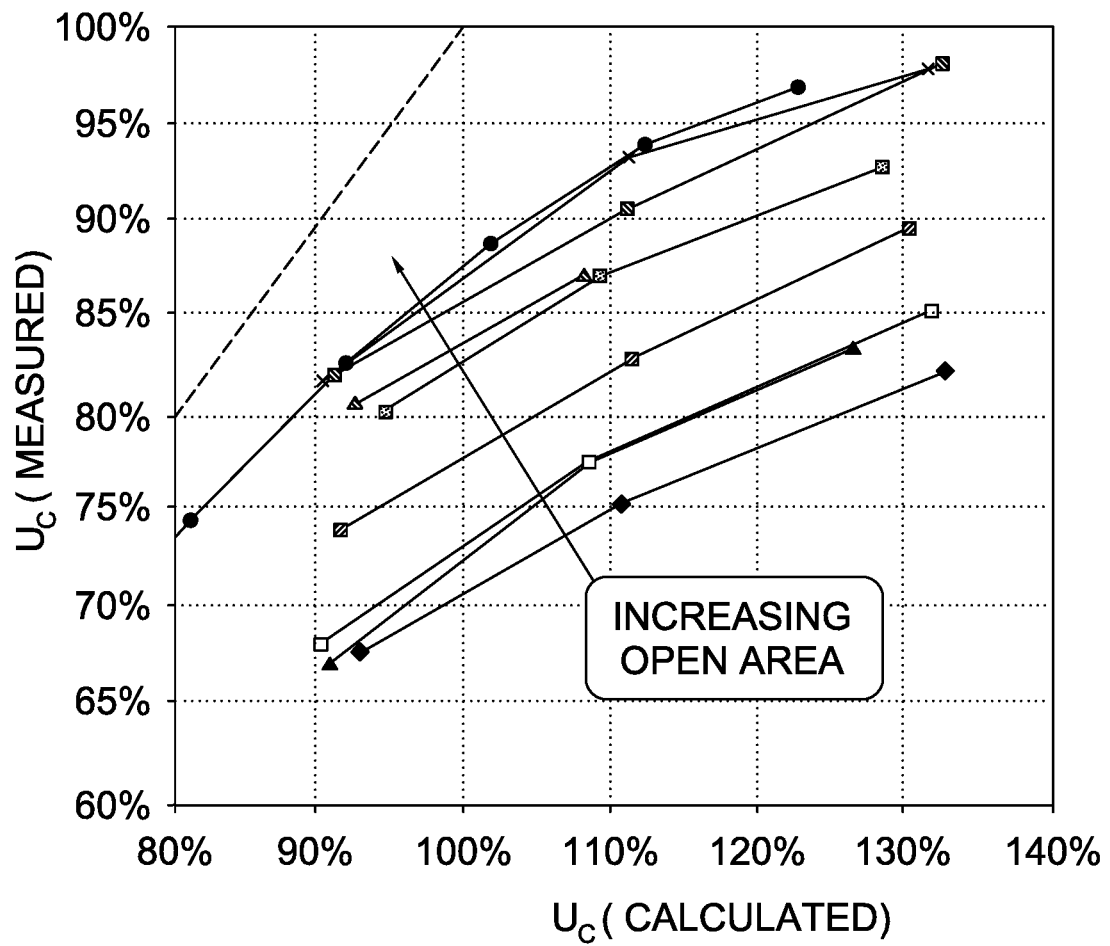
FIG. 11 shows results for actual $CO_2$ utilization versus apparent $CO_2$ utilization for molten carbonate fuel cells with a variety of cathode open areas.

FIG. 11 shows actual $CO_2$ utilization versus apparent $CO_2$ utilization for fuel cells with various amounts of cathode open area. The lines in FIG. 11 correspond to fuel cells with open areas ranging from 33% (line A) to at least 65% (line I). The data in FIG. 11 was generated using similar cathode gas input streams and similar target values for average current density. (Other operating conditions were allowed to vary, to maintain the target value for the average current density.) Based on having similar average current density and similar $CO_2$ concentrations in the cathode gas input streams, the data in FIG. 11 mostly corresponds to data points at the same level of apparent $CO_2$ utilization. However, due to the variation in open area at the cathode surface, the actual $CO_2$ utilization varied for each fuel cell from values near 70% to up to 95% or more, depending on the target current density and the available open area.

As shown in FIG. 11, increasing the open area tends to increase the actual $CO_2$ utilization while decreasing the amount of alternative ion transport. Thus, at a given level of apparent $CO_2$ utilization, the actual $CO_2$ utilization increases with increasing open area. As an example, the bottom three sets of data in FIG. 11 correspond to cathode collector configurations where the open area at the cathode surface is between 33% to 40%, which correspond to conventional values. At such conventional values for the open area at the cathode surface, an apparent $CO_2$ utilization of 130% or higher was needed to achieve only 80% actual $CO_2$ utilization. This means that more than a third of the current density being generated by the fuel cell was based on alternative ion transport. By contrast, for the top three data sets having an open area of roughly 60% or higher, the actual $CO_2$ utilization was close to 95% for values of the apparent $CO_2$ utilization near 130%. This represents a substantial increase in the amount of $CO_2$ capture based on increasing the open area at the cathode surface. More generally, the trend of increasing actual $CO_2$ utilization relative to the average current density by increasing the open area at the cathode surface is maintained at all of the process conditions shown in FIG. 11.

Figure 12:
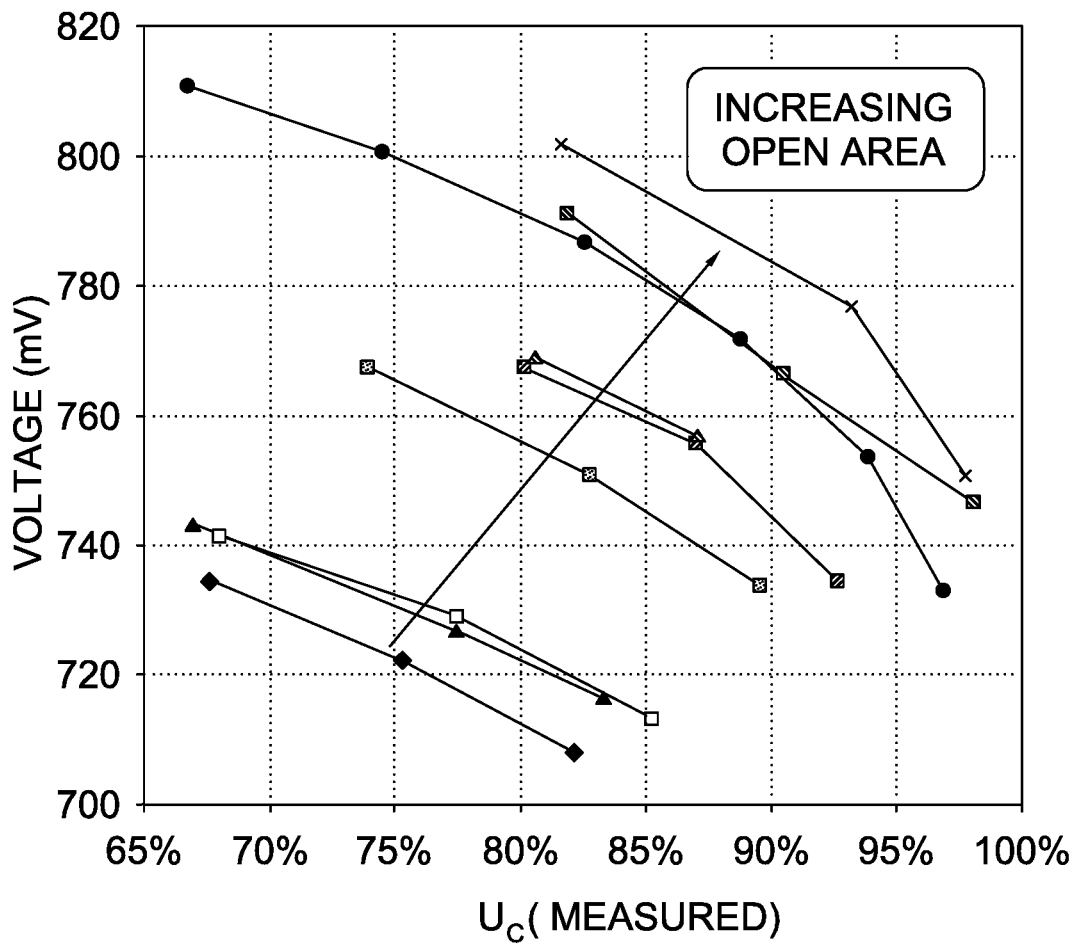
FIG. 12 shows operating voltage versus actual $CO_2$ utilization for molten carbonate fuel cells with a variety of cathode open areas.

FIG. 12 shows a comparison of fuel cell operating voltage versus actual $CO_2$ utilization for the data shown in FIG. 11. As shown in FIG. 12, increasing the open area results in an increase in operating voltage for the fuel cell. This matches the results in FIG. 11, which show decreasing alternative ion transport as the open area is increased. It is noted that the reactions involved in hydroxide ion transport across the electrolyte correspond to a lower electrochemical potential. FIG. 12 appears to show that reducing the amount of such alternative ion transport (as shown in FIG. 11) can lead to increased operating voltage within a molten carbonate fuel cell.

Figure 13:
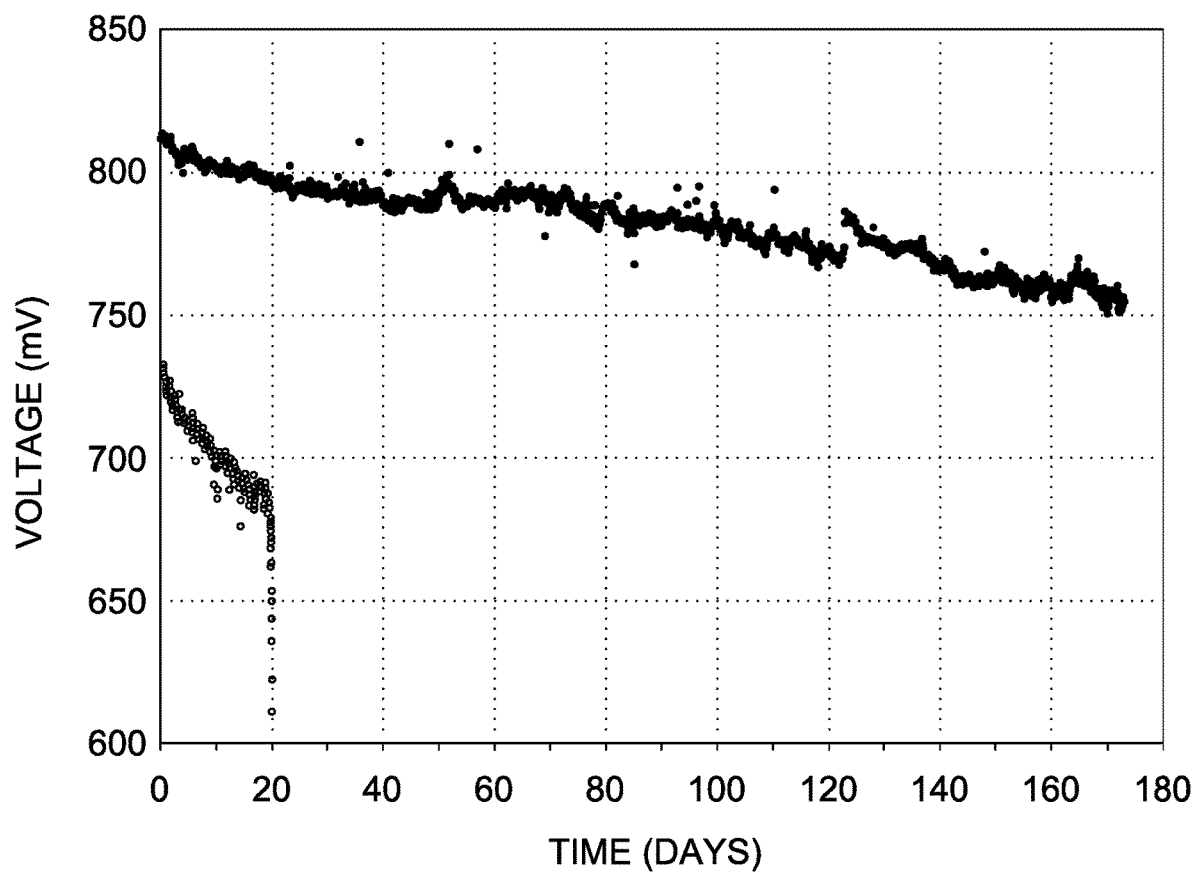
FIG. 13 shows an example of average current density over time for fuel cells having different open areas at the cathode surface operated under conditions that result in substantial alternative ion transport.

FIG. 13 shows voltage over time data for additional fuel cells that were operated under conditions for elevated $CO_2$ capture. The lower data set in FIG. 13 corresponded to another fuel cell with a conventional cathode collector/cathode surface structure, resulting in an open area at the cathode surface of 33%. The upper data set in FIG. 13 corresponded to a fuel cell with an alternative cathode collector configuration, resulting in an open area at the cathode surface of 50% or more. Under conventional conditions (i.e., de minimis alternative ion transport), the fuel cell with the open area of 50% or more had an operating voltage of 830 mV or higher. The lower data set corresponds to data from a fuel cell using a conventional cathode collector, which resulted in a conventional open area of 33%. Under conventional conditions, the fuel cell with the open area of 33% had an operating voltage between 750 mV and 780 mV.

The operating conditions for the fuel cells in FIG. 13 included a $CO_2$ concentration in the cathode input stream of roughly 4.5 vol %. The fuel cells were operated to maintain an average current density of roughly 100 $mA/cm^2$. The actual $CO_2$ utilization was 90%, but substantial alternative ion transport also occurred. For the fuel cell with the open area of 33%, the apparent $CO_2$ utilization was 130%. Under these conditions, a drop in the fuel cell operating voltage to roughly 730 mV was observed almost immediately, with rapid additional decrease. The decline in operating voltage continued for roughly 20 days, at which time the fuel cell stopped working entirely. By contrast, for the fuel cell with the open area of 50% or more at the cathode surface, the apparent $CO_2$ utilization was between 10% and 20% greater than the actual $CO_2$ utilization. For the fuel cell with the open area at the cathode surface of 50% or more, operating with substantial alternative ion transport also resulted in reduction in operating voltage to roughly 810 mV. However, the amount of further degradation over time was less severe, with the fuel cell maintaining an operating voltage greater than 750 mV after 150 days of operation.

The fuel cells in FIG. 13 illustrate an additional benefit of using a cathode collector that provides increased open area at the cathode surface. At the conditions shown in FIG. 13, the fuel cell with an open area of 33% quickly degraded to a point where the fuel cell became inoperable. By contrast, the fuel cell with an open area at the cathode surface of 50% or more exhibited a more gradual loss of voltage, allowing the fuel cell to maintain operation for more than 150 days.

ADDITIONAL EMBODIMENTS

Embodiment 1

A method for producing electricity in a molten carbonate fuel cell, the method comprising: introducing an anode input stream comprising $H_2$, a reformable fuel, or a combination thereof into an anode gas collection zone, the anode gas collection zone being defined by an anode surface, a first separator plate, and an anode collector providing support between the anode surface and the separator plate; introducing a cathode input stream comprising $O_2$, $H_2O$, and $CO_2$ into a cathode gas collection zone, the cathode gas collection zone being defined by a cathode surface, a second separator plate, and a cathode collector providing support between the cathode surface and the second separator plate; operating the molten carbonate fuel cell at a transference of 0.97 or less and an average current density of 60 mA/cm² or more to generate electricity, an anode exhaust comprising $H_2$, CO, and $CO_2$, and a cathode exhaust comprising 2.0 vol % or less $CO_2$, 1.0 vol % or more $O_2$, and 1.0 vol % or more $H_2O$, wherein an average cathode gas lateral diffusion length is 0.40 mm or less, or an open area of the cathode surface comprises 45% or more of a total surface area of the cathode surface, or a combination thereof.

Embodiment 2

The method of Embodiment 1, wherein the cathode input stream comprises 5.0 vol % or less of $CO_2$ (or 4.0 vol % or less), or wherein the cathode exhaust comprises 1.0 vol % or less of $CO_2$, or a combination thereof.

Embodiment 3

The method of any of the above embodiments, wherein the transference is 0.95 or less (or 0.93 or less, or 0.90 or less).

Embodiment 4

The method of any of the above embodiments, wherein an average contact area diffusion length is 1.0 mm or less (or 0.9 mm or less, or 0.7 mm or less), or a contact area of the cathode collector with the cathode surface is greater than 10% of the total surface area of the cathode surface, or a combination thereof.

Embodiment 5

The method of any of the above embodiments, wherein an average cathode gas lateral diffusion length is 0.4 mm or less (or 0.3 mm or less, or 0.2 mm or less), or a contact area of the cathode collector with the cathode surface is greater than 10% of the total surface area of the cathode surface, or a combination thereof.

Embodiment 6

The method of any of the above embodiments, wherein the cathode surface comprises one or more grooves, and optionally wherein 2% or more of the open surface area corresponds to the one or more grooves.

Embodiment 7

The method of any of the above embodiments, wherein the cathode collector further comprises an open lattice structure with a lattice size of 0.1 mm or less in contact with the cathode surface and a spacing structure providing support between the open lattice structure and the second separator plate.

Embodiment 8

The method of any of the above embodiments, wherein the voltage drop across the cathode is 0.4 V or less, or wherein the electricity is generated at a voltage of 0.55 V or more, or a combination thereof.

Embodiment 9

The method of any of the above embodiments, wherein the open area of the cathode surface is 50% or more (or 60% or more, or 75% or more), or wherein the average cathode gas lateral diffusion length is 0.35 mm or less, or a combination thereof.

Embodiment 10

The method of any of the above embodiments, wherein a $H_2$ concentration in the anode exhaust is 5.0 vol % or more, or wherein a combined concentration of $H_2$ and CO in the anode exhaust is 6.0 vol % or more, or a combination thereof.

Embodiment 11

The method of any of the above embodiments, wherein a distance from any point on the cathode surface to an open area on the cathode surface is 1.0 mm or less.

Embodiment 12

A molten carbonate fuel cell, comprising: an anode; a first separator plate; an anode collector in contact with the anode and the first separator plate to define an anode gas collection zone between the anode and the first separator plate; a cathode; a second separator plate; a cathode collector in contact with the cathode and the second separator plate to define a cathode gas collection zone between the cathode and the second separator plate; and an electrolyte matrix comprising an electrolyte between the anode and the cathode, wherein an average cathode gas lateral diffusion length is 0.40 mm or less, or an open area of the cathode surface is greater than 45% of a total surface area of the cathode surface (or 60% or more, or 75% or more), or a combination thereof.

Embodiment 13

The molten carbonate fuel cell of Embodiment 12, wherein an average contact area diffusion length is 1.0 mm or less, or a contact area of the cathode collector with the cathode surface is greater than 10% of the total surface area of the cathode surface, or wherein a distance from any point on the cathode surface to an open area on the cathode surface is 1.0 mm or less, or a combination thereof.

Embodiment 14

The molten carbonate fuel cell of Embodiment 12 or 13, wherein the cathode surface comprises one or more grooves, and optionally wherein at least 2% of the open surface area corresponds to the one or more grooves.

Embodiment 15

The molten carbonate fuel cell of any of Embodiments 12-14, wherein the cathode collector comprises an open lattice structure with a lattice size of 0.1 mm or less in contact with the cathode surface and a spacing structure providing support between the open lattice structure and the second separator plate.

All numerical values within the detailed description and the claims herein are modified by "about" or "approximately" the indicated value, and take into account experimental error and variations that would be expected by a person having ordinary skill in the art.

Although the present invention has been described in terms of specific embodiments, it is not necessarily so limited. Suitable alterations/modifications for operation under specific conditions should be apparent to those skilled in the art. It is therefore intended that the following claims be interpreted as covering all such alterations/modifications that fall within the true spirit/scope of the invention.

The invention claimed is:

1. A method for producing electricity in a molten carbonate fuel cell, the method comprising:
introducing an anode input stream comprising H2, a reformable fuel, or a combination thereof into an anode gas collection zone, the anode gas collection zone being defined by an anode surface, a first separator plate, and an anode collector providing support between the anode surface and the first separator plate;
introducing a cathode input stream comprising O2 and CO2 into a cathode gas collection zone, the cathode gas collection zone being defined by a cathode surface, a second separator plate, and a cathode collector providing support between the cathode surface and the second separator plate; and
operating the molten carbonate fuel cell at a transference of 0.95 or less, a CO2 utilization of at least 75% and an average current density of 60 mA/cm2 or more to generate electricity, an anode exhaust comprising H2, CO, and CO2, and a cathode exhaust comprising 2.0 vol% or less CO2, 1.0 vol% or more O2, and 1.0 vol% or more H2O,
wherein 45% or more of the cathode collector is an open area, wherein the open area is a portion of the cathode collector not in contact with the cathode surface.

2. The method of claim 1, wherein an average contact area diffusion length is 1.0 mm or less, or a contact area of the cathode collector with the cathode surface is greater than 10% of a total surface area of the cathode surface, or a combination thereof.

3. The method of claim 1, wherein the cathode surface comprises one or more grooves.

4. The method of claim 3, wherein 2% or more of the open surface area corresponds to the one or more grooves.

5. The method of claim 1, wherein the transference is 0.90 or less.

6. The method of claim 1, wherein 50% or more of the cathode collector is an open area.

7. The method of claim 1, wherein an average cathode gas lateral diffusion length is 0.35 mm or less.

8. The method of claim 1, wherein a voltage drop across the cathode is 0.4 V or less, or wherein the electricity is generated at a voltage of 0.55 V or more, or a combination thereof.

9. The method of claim 1, wherein 75% or more of the cathode collector is an open area.

10. The method of claim 1, wherein a H2 concentration in the anode exhaust is 5.0 vol% or more, or wherein a combined concentration of H2 and CO in the anode exhaust is 6.0 vol% or more, or a combination thereof.

11. The method of claim 1, wherein a distance from any point on the cathode surface to an open area on the cathode surface is 1.0 mm or less.

12. The method of claim 1, wherein the cathode input stream comprises 5.0 vol% or less of CO2, or wherein the cathode exhaust comprises 1.0 vol% or less of CO2, or a combination thereof.

13. The method of claim 1, wherein the cathode exhaust comprises 1.0 vol% or less of CO2.

14. The method of claim 1, wherein an open mesh screen having a mesh size of 1.0 mm or less average cell width and/or length is positioned between the cathode surface and the cathode collector.

15. A method for producing electricity in a molten carbonate fuel cell, the method comprising:
introducing an anode input stream comprising H2, a reformable fuel, or a combination thereof into an anode gas collection zone, the anode gas collection zone being defined by an anode surface, a first separator plate, and an anode collector providing support between the anode surface and the first separator plate;
introducing a cathode input stream comprising O2 and CO2 into a cathode gas collection zone, the cathode gas collection zone being defined by a cathode surface, a second separator plate, and a cathode collector providing support between the cathode surface and the second separator plate; and
operating the molten carbonate fuel cell at a transference of 0.97 or less, a CO2 utilization of at least 75%, and an average current density of 60 mA/cm2 or more to generate electricity, an anode exhaust comprising H2, CO, and CO2, and a cathode exhaust comprising 2.0 vol% or less CO2, 1.0 vol% or more O2, and 1.0 vol% or more H2O,
wherein 45% or more of the cathode collector is an open area, wherein the open area is a portion of the cathode collector not in contact with the cathode surface, wherein the cathode surface comprises one or more grooves, and wherein 2% or more of the open surface area corresponds to the one or more grooves.

16. The method of claim 15, wherein the cathode exhaust comprises 1.0 vol% or less of CO2.

17. The method of claim 15, wherein an open mesh screen having a mesh size of 1.0 mm or less average cell width and/or length is positioned between the cathode surface and the cathode collector.

18. The method of claim 1, wherein the transference is 0.95 or less.

19. The method of claim 1, wherein 50% or more of the cathode collector is an open area.

20. The method of claim 1, wherein 75% or more of the cathode collector is an open area.

* * * * *